United States Patent [19]

Boese et al.

[11] Patent Number: 5,084,816
[45] Date of Patent: Jan. 28, 1992

[54] REAL TIME FAULT TOLERANT TRANSACTION PROCESSING SYSTEM

[75] Inventors: John O. Boese; Patrick J. Donnelly, both of Bridgewater; Warren S. Gifford, Holmdel; Gabriel G. Schlanger, West Orange, all of N.J.

[73] Assignee: Bell Communications Research, Inc., Livingston, N.J.

[21] Appl. No.: 453,042

[22] Filed: Dec. 12, 1989

Related U.S. Application Data

[63] Continuation of Ser. No. 125,463, Nov. 25, 1987, abandoned.

[51] Int. Cl.$^5$ ............ G06F 13/00; G06F 15/16
[52] U.S. Cl. ............ 395/575; 364/285; 364/285.3; 364/222.2; 364/240.7; 364/242.94; 364/DIG. 1
[58] Field of Search ... 364/200 MS File, 900 MS File

[56] References Cited

U.S. PATENT DOCUMENTS

| | | | |
|---|---|---|---|
| 3,614,328 | 10/1971 | McNaughton et al. | 179/15 |
| 3,865,999 | 2/1975 | Spitaels | 179/175.2 |
| 3,912,873 | 10/1975 | Skaperda | 179/18 |
| 4,112,488 | 9/1978 | Smith | 364/200 |
| 4,144,407 | 3/1979 | Zaffignani et al. | 178/50 |
| 4,191,860 | 3/1980 | Weber | 179/18 |
| 4,356,546 | 10/1982 | Whiteside et al. | 364/200 |
| 4,392,199 | 7/1983 | Schmitter et al. | 364/200 |
| 4,412,281 | 10/1983 | Works | 364/200 |
| 4,421,955 | 12/1983 | Mori et al. | 179/18 |
| 4,453,210 | 6/1984 | Suzuki et al. | 364/200 |
| 4,453,215 | 6/1984 | Reid | 364/200 |
| 4,484,273 | 11/1984 | Stiffler et al. | 364/200 |
| 4,484,275 | 11/1984 | Katzman et al. | 364/200 |
| 4,509,117 | 4/1985 | Korowitz | 364/200 |
| 4,577,272 | 3/1986 | Ballew et al. | 364/200 |
| 4,750,177 | 6/1988 | Hendrie et al. | 364/200 |
| 4,783,733 | 11/1988 | Greig et al. | 364/200 |

OTHER PUBLICATIONS

Bell Communication Research Specification of Signalling System 7, Tech Ref. TR-NPL-000246, Issue 1, vol. 1, 1985, Bell Communication Research.
"Get Inside CCITT Signalling System No. 7", *Telephony*, 3/10/86, pp. 72-77, M. G. Walker.
"Service Control Point—Database For 800 Service", written by Boese and Hood, Bell Communication Research.

*Primary Examiner*—Eddie P. Chan
*Attorney, Agent, or Firm*—James W. Falk

[57] ABSTRACT

A real time fault tolerant transaction processing system, particularly one suited for use in a service control point (SCP), is described. Specifically, the system utilizes a communication protocol, such as signalling system 7, that adaptively distributes message packets on an equal basis over multiple physical links that connect two points, such as an SCP and a signalling transfer point (STP), and non-fault tolerant front end and back end processors that are connected to each physical link for processing packets appearing on that link and providing corresponding responses thereto. All the front and back end processors are loosely coupled together for purposes of processor synchronization and re-assignment. Through this system, all the physical links simultaneously carry an equal number of packets which are, in turn, processed by all the processors connected thereto. In the event any physical link or either a front or back end processor connected thereto fails, then that link is declared to be out of service. Consequently, the protocol merely re-assigns all subsequently occurring packets to the other links until such time as the fault is cleared. As the result of link re-assignment, there is advantageously no need to connect a fault tolerant processor to each physical link. This, in turn, substantially and advantageously reduces the complexity and cost of the fault tolerant transaction processing system.

23 Claims, 15 Drawing Sheets

| FIG. 5A |
| FIG. 5B |

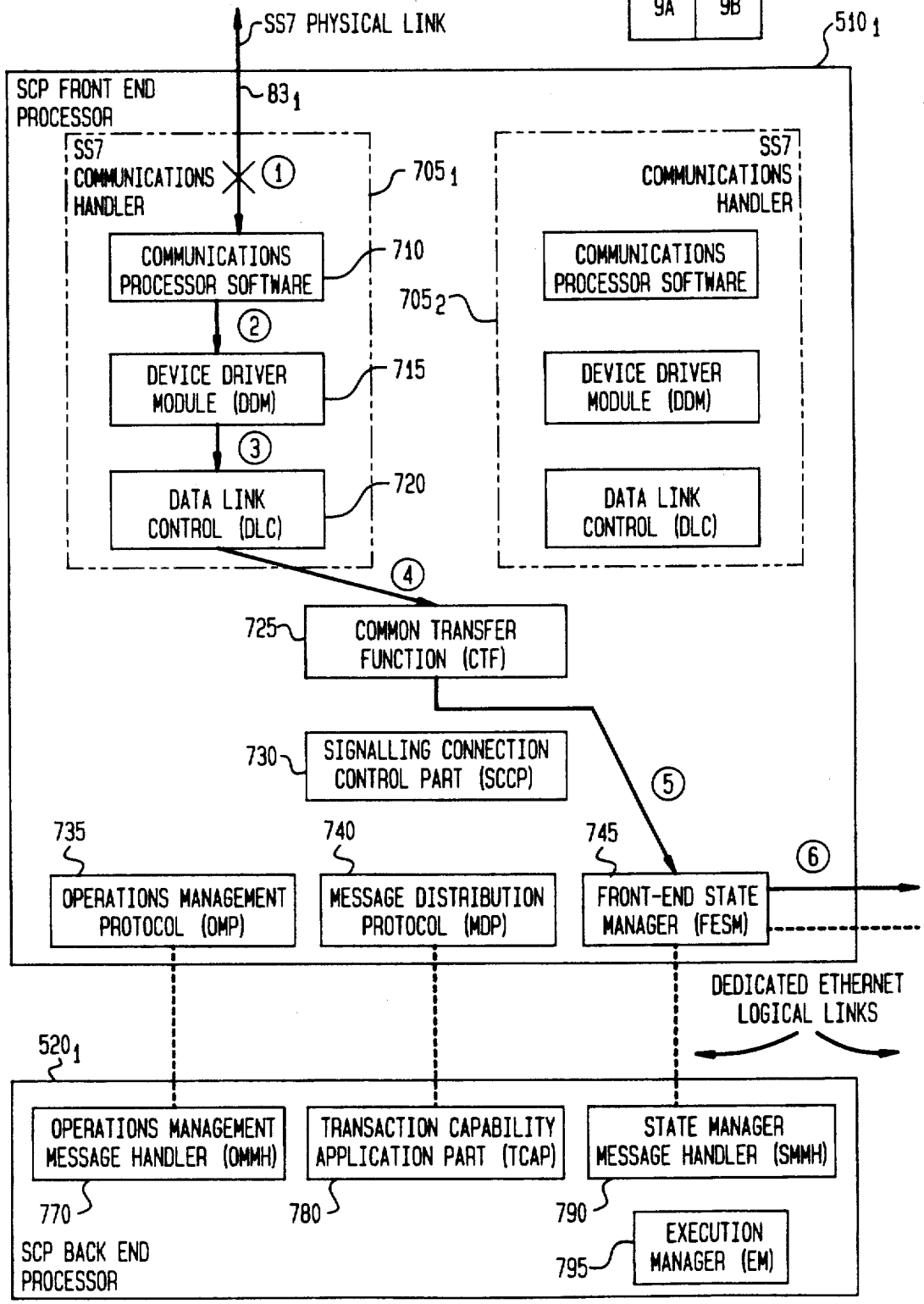

REAL TIME FAULT TOLERANT TRANSACTION PROCESSING SYSTEM

This application is a continuation of application Ser. No. 07/125,463, filed Nov. 25, 1987, now abandoned.

BACKGROUND OF THE DISCLOSURE

1. Field of the Invention

The invention relates to a real time fault tolerant transaction processing system and particularly one suited for use in a service control point.

2. Description of the Prior Art

Currently, many computer controlled systems, particularly those used in transaction processing, must operate at extremely high levels of reliability. Unfortunately, a computer which controls such a system, due to the complexity of the computer hardware and attendant software, is oftentimes the least reliable component in the system and is frequently a main cause of system failure. Therefore, in an effort to provide increased reliability, the art has turned to so-called fault tolerant computers for use in transaction processing systems. However, computers of this type possess serious drawbacks which, as discussed in detail below, severely limit their utility. As a result, such computers can not be used to impart increased reliability to a variety of computer based transaction processing systems.

One specific transaction processing system that must operate at an extremely high level of reliability is a service control point ("SCP") that controls routing of telephone calls, within the telephone network, that require special handling, such as 800 and calling ("credit") card calls. In particular, whenever a telephone subscriber dials such a call, this call is first routed to an equal access switch, located either at a local office or elsewhere, which has service switching point capability (such a switch will hereinafter be referred to as an "SSP"). Primarily, the SSP processes calls that require remote data base translation. Now, whenever the SSP recognizes an incoming a call as one that requires special handling, the SSP suspends normal call processing, launches a message over a common channel signalling ("CCS") network to an SCP to determine how the call is to be routed, and finally upon receipt of a return message from the SCP, routes the call in a manner specified by the return message.

Specifically, whenever a subscriber places a call to an 800 number, the local switch routes the call to an SSP. The SSP fabricates an query in the form of a packet. This packet contains the 800 called number and a request for a destination routing number associated with the 800 number and, additionally, identification of a particular long distance (inter-exchange) carrier over which the call is to be routed. This packet is then routed over a common channel signalling line in a CCS network to a particular one of several geographically separated signalling transfer points (STPs). Specifically, the CCS network typically consists of a multi-level hierarchy of STPs, wherein each STP is a primarily a packet switch. The first STP to receive the packet, i.e. the "originating" STP, then routes the packet, over an available link to an SCP for processing or, via a specified link, to another STP for eventual routing to an SCP. To perform this routing correctly, each STP that routes this packet examines a routing field located in the packet and, in response, determines where the packet should be routed. In particular, for an 800 call, the first six digits of the dialed 800 number specify the appropriate SCP that is to receive a corresponding packet from an SSP.

The SCP itself is a fault tolerant transaction processing system that contains various databases that collectively provide desired call routing information. These databases contain a "customer record" which specifies how each 800 call is to be routed. This record frequently contains one or more destination routing numbers associated with a particular 800 number and specifies the manner in which one of these destination routing numbers is to be selected, e.g. in accordance with the time of day, day of month, originating numbering plan area of the caller or other pre-defined method. The SCP is a transaction processor in which a transaction involves the receipt of a packet and the generation of a corresponding response. In particular, whenever a query is received, via an incoming packet, the SCP performs associated database access operations to obtain a necessary destination routing number and an inter-exchange carrier identification for the corresponding 800 call. The resulting information is then transmitted, as a packet, over the CCS network by the SCP, via one or more STPs, back to an "originating" SSP which generated the corresponding query. Once a packet containing the destination routing number and inter-exchange carrier selection is received, the originating SSP appropriately routes the 800 call to the destination routing number. If the destination routing number is within the local access and transport area (LATA) served by the local telephone company, then the 800 call is routed by the SSP, via switching and transport facilities provided by that telephone company, directly to the destination routing number. Alternatively, if the destination routing number is outside the LATA served by the local telephone company, then the SSP routes the 800 call to the identified inter-exchange carrier with specific instructions (e.g. the destination routing number) for routing the call to its final destination.

To ensure that 800 service is reliably provided all the time, an SCP must operate with minimal down time, preferably less than three minutes per year. Two techniques are often used in the art to impart a high degree of fault tolerance to the SCP: use of redundant link connections from the CCS network to an SCP and use of fault tolerant processors within the SCP.

First, each SSP is connected, by separate links, to two different STPs, each of which, in turn, is connected by separate links to two different SCPs. In the event one of these links fails, then traffic destined to a particular SCP is re-routed thereto via another link or a different STP.

Second, the art teaches that each processor used within the SCP must be fault tolerant. Generally, SCPs known in the art contain two front end processors, two back end processors and a fault tolerant mass memory device, such as a dual ported disk drive. Each front end processor is connected to both incoming links that terminate at the SCP. Each back end processor is connected to both front end processors. Also, each back end processor is connected to the disk drive through one of its dual ports. In operation, one of the front end processors formulates a database query in response to each packet appearing on either link. One of the back end processors receives a query from the front end processor and, in response, performs various database look-up operations, through one of the ports of the disk drive, to obtain the desired information. The front and back end processors are both fault tolerant. Specifically, the fault tolerant processors, as is typically taught in the art, operate in a hot/standby configuration in which one processor (the "hot" processor) is actively processing packets or queries while the other (the "standby" processor) remains in a standby condition ready to take over processing in the event the hot processor fails. A typical example of such a processor is shown in U.S. Pat. No. 4,484,275 (issued Nov. 20, 1984 to J. Katzman et al and hereinafter referred to as the '275 patent).

Fault tolerant processors known in the art possess serious drawbacks which substantially limit their utility in an SCP.

First, fault tolerant processors are very expensive. While a non-fault tolerant minicomputer having sufficient throughput for use in an SCP may cost upwards of $20,000, a fault tolerant processor of the same capacity may cost in the range of $100,000 or more. The additional cost is incurred as the direct result of highly specialized hardware and very sophisticated software, particularly for fault detection and recovery, needed in these processors to provide an acceptable degree of fault tolerance. Specifically, the software used in fault tolerant processors is often of such complexity that it accounts for upwards of 65% of the total cost of the processor. Thusfar, the art has failed to provide any "off the shelf" software that can be purchased and installed in two relatively low cost commercially available stand alone processors to provide an acceptable degree of fault tolerant operation therebetween.

Second, in a traditional fault tolerant processor, such as that shown in the '275 patent, the hot processor handles the entire processing load while the standby processor remains idle. Consequently, in an application, such as the SCP, where queries may occur at a rate in excess of 200/second, the hot processor itself must be capable of handling all these queries. This mandates that the each processor must have a sufficiently large throughput which further increases the cost of these processors. Now, in an attempt to reduce cost, the art teaches, as shown by the architecture described in U.S. Pat. No. 4,356,546 (issued Oct. 26, 1982 to A. Whiteside et al), that a set of different tasks can be assigned to and executed by a different processor. In this manner, each processor is not required to handle the entire processing load but rather a proportionate share thereof. Consequently, processors having a reduced capacity can be used to implement a fault tolerant architecture. Unfortunately, complex hardware and sophisticated and costly software is needed to monitor the execution of all tasks and, in the event a processor fails, re-schedule tasks among all active remaining processors. As a result, the cost savings that may accrue through the use of smaller processors are more than offset by the added expense of task monitoring and re-scheduling hardware and its attendant software.

Third, traditional fault tolerant processors, such as that described in the above-noted '275 patent, utilize separate processors that are tightly coupled together through multiple busses. Unfortunately, inter-connecting processors in this fashion forces each processor to be somewhat dependent upon the other processors. Specifically, should one such processor fail, then depending upon the severity of the failure, e.g. whether a processor inter-connection bus is taken down as a result, the failed processor may well disrupt the operation of one or more of the remaining processors and potentially halt all further processing occurring throughout the fault tolerant system. Other illustrative fault tolerant architectures that rely on relatively tight inter-processor coupling are shown, for example, in U.S. Pat. Nos.: 4,484,273 (issued Nov. 20, 1984 to J. Stiffler et al); 4,421,955 (issued Dec. 20, 1983 to H. Mori et al); and 4,412,281 (issued Oct. 25, 1983 to G. Works). A similar dependency problem arises in those fault tolerant processors known in the art which rely on distributing tasks through a common switch to any one of several inter-connected processors. Such an arrangement is illustratively shown in U.S. Pat. No. 4,392,199 (issued July 5, 1983 to E. Schmitter et al). Here, the overall reliability of the fault tolerant processor is limited by the reliability of the common switch. Should the switch fail, all processing will stop.

Fourth, other fault tolerant processors known in the art rely on simultaneously processing tasks through paired redundant hardware and comparing the results to isolate faults. For example, in the architecture described in U.S. Pat. No. 4,453,215 (issued June 5, 1984 to R. Reid), identical tasks are simultaneously processed, on a synchronous basis, through two identical dual processors. The results obtained from both processors within a dual processor are compared against each other to detect any errors (i.e. any differences) occurring within that dual processor and, should an error be detected, to immediately take that one of the two dual processors out of service. As a result, the faulty dual processor is taken out of service before it has a chance to transfer any possibly erroneous information onward to a bus. Although this arrangement may, in certain instances, provide an acceptable level of fault tolerance, substantial expense is incurred for quadruplicating processing elements.

Thus, a need exists in the art for a transaction processing system, particularly one suitable for use in a service control point, that provides a very high degree of fault tolerance without complex hardware, sophisticated software and the attendant high cost associated with traditional fault tolerant processing systems.

SUMMARY OF THE INVENTION

The above-described drawbacks inherent in the art for providing a fault tolerant transaction processor, particularly one suitable for use within a service control point, are advantageously eliminated in accordance with the teachings of the present invention by a network based communication system which employs a communication protocol that adaptively distributes packets on an equal basis over multiple physical links that connect two points within the network, such as an SCP and a signalling transfer point (STP), and non-fault tolerant front end and back end processors that are connected to each physical link for handling the processing of packets appearing on that link. All the front and back end processors are loosely coupled together for purposes of processor synchronization and re-assignment. Through this communication system, all the physical links simultaneously carry an approximately equal number of packets which are, in turn, processed by all the processors connected thereto. In the event any physical link or either a front or back end processor connected thereto fails, then that link is declared to be out of service. Consequently, the protocol merely re-assigns all subsequently occurring packets to the other links until such time as the fault is cleared. As the result of link re-assignment, there is advantageously no need to connect a fault tolerant processor to each physical link. This, in turn, substantially and advantageously reduces the complexity and cost of the fault tolerant transaction processing system.

In accordance with a specific embodiment of the present invention, the inventive system employs "j+1" sparing in which j+1 processors (where j is an integer) are used in situations that would normally require j processors. Specifically, if only three physical links are sufficient to carry expected traffic, then four physical links with accompanying front and back end processors would be used in lieu of three physical links with the protocol providing approximately equal traffic (packet) distribution among the four links. Since use of an extra link and an extra set of processors is far less expensive than completely duplicating the entire system hardware as has been done in the past to provide fault tolerance, use of "j+1" sparing results in a substantially less expensive fault tolerant processing system than has been taught in the art.

Furthermore, since no processors (either front or back end) are normally in an idle state but instead all such processors are productively processing packets, then advantageously little processing capacity is wasted, at least far less than that associated with traditional fault tolerant processors that rely on using separate hot/standby processors. Moreover, since the processors used in the inventive system are non-fault tolerant and have a smaller processing capacity than those typically associated with fault tolerant architectures, use of these non-fault tolerant processors results in a fault tolerant architecture that is substantially less expensive than that previously possible. In addition, since the all the front and back end processors are loosely coupled and a single back end processor can selectively bring up or take down subsystem (application) processing in each corresponding front/back end processor pair located within an entire SCP, the software that co-ordinates all the front and back end processors in the inventive system is far less sophisticated than that associated with traditional fault tolerant architectures. This, in turn, further reduces the cost of providing a fault tolerant real-time transaction processing system according to the teachings of the present invention.

Moreover, in accordance with a feature of the invention, the inventive architecture advantageously bifurcates the software that provides an application, such as 800 service, from the software used to implement a fault tolerant communication network. In the past, application and communications software were frequently intertwined which slowed and significantly increased the expense of developing new applications for use in fault tolerant network environments. By separating the software, many new transaction based applications destined for use in a fault tolerant network environment can be advantageously developed without having to modify the associated communication software. This advantageously shortens the development cycle substantially and also provides significant attendant cost savings.

BRIEF DESCRIPTION OF THE DRAWING

The teachings of the present invention can be readily understood by considering the following detailed description in conjunction with the accompanying drawing, in which:

FIG. 9 shows the correct alignment of the drawing sheets for FIGS. 9A and 9B;

FIGS. 9A and 9B diagrammatically show a sequence of inter-process communications that occur within SCP front end processors $510_1$ and $510_2$ shown in FIG. 8 during the handling of a link failure;

To facilitate understanding, identical reference numerals have been used to designate identical elements that are common to the figures.

DETAILED DESCRIPTION

The teachings of the present invention are applicable to implementing a wide variety of real-time fault tolerant transaction processing systems. For the sake of brevity, the present invention will be discussed in the context of a real-time fault tolerant transaction processing system for use in a service control point (SCP) that processes packets supplied over any link existing within a link set that connects a signalling transfer point (STP) to the SCP. Clearly, after reading the following description, those skilled in the art will readily appreciate how the teachings of the present invention can be incorporated into other transaction processing systems to provide fault tolerance.

I. Background

To fully appreciate the teachings of the present invention, the following discussion will first examine how packets occurring within a telephone signalling network were traditionally processed and then address the inventive system.

Figure 1:
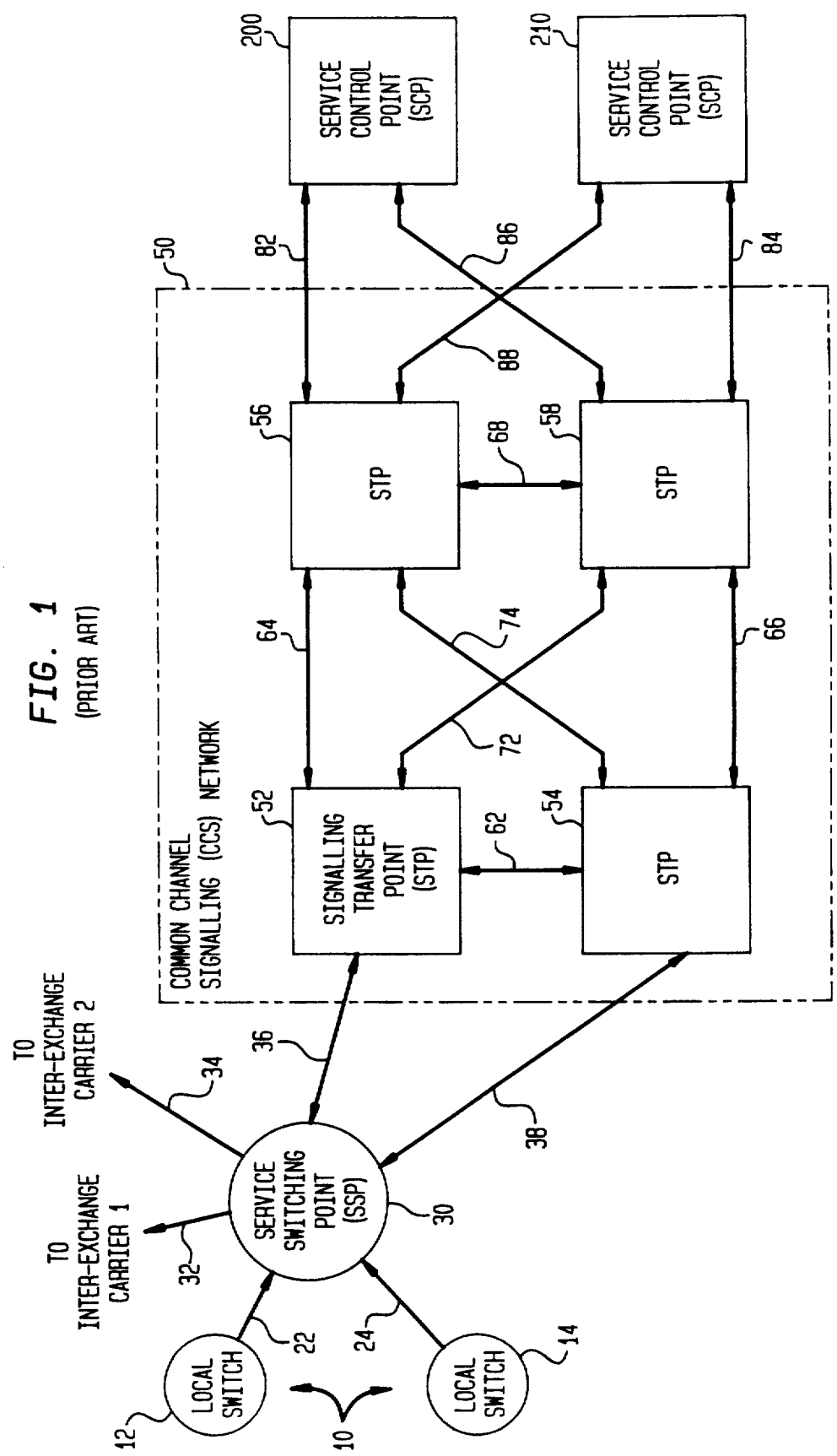
FIG. 1 is a simplified diagram of a prior art architecture of a telephone signalling network that utilizes signalling system 6.

In particular, FIG. 1 shows a simplified diagram of a prior art architecture of a telephone signalling network that employs transaction processing. In general, this network provides special telephone routing information to support a variety of special calls, such as 800 number calls and calling card services. This information is obtained through remote database translations, using caller supplied information such as a called number or a credit card number, to appropriately access one or more databases that are embedded within the telephone signalling network. For illustrative purposes, this network and the invention will be discussed in the context of processing calls to 800 numbers.

Assume for the moment that a caller dials a call to an 800 number. The caller (not shown) is generally connected to a local switch, such as local switch 12 or 14. An 800 telephone number is actually a logical telephone number. To route such a call to its proper destination, the 800 number must be translated to an appropriate destination routing number to which the call can be subsequently routed. The specific destination routing number is specified in a customer record stored within one or more databases residing within a service control point (SCP). This record typically contains one and often more destination routing numbers and associated inter-exchange carrier selections that are associated with a dialed 800 number and the manner in which one of these destination routing number and its associated inter-exchange carrier are to be selected, e.g. time of day, day of month, originating numbering plan of the caller and the like. An SCP is an on-line real time fault tolerant transaction processing system that provides call processing information (responses) in response to inquiries received via STPs connected within the signalling network. This call processing information can include call routing instructions, such as for 800 calls, or other instructions depending upon the information requested by an SSP. In particular, several different database applications can be concurrently available on an SCP. The following discussion addresses one such application, 800 service.

Now, to process an 800 number call, whenever a local switch, typified by either local switch 12 or 14, receives an 800 call, this switch routes the call onward, either through trunk 22 or through trunk 24, respectively, to an equal access switch, located either at a local office or elsewhere, that has service switching point capability (such a switch will be collectively referred to as an "SSP"), such as SSP 30. The function of the SSP is to first recognize an incoming call as one requiring special handling —such as 800 number calls, then suspend normal call processing for this call, thereafter obtain appropriate routing instructions through the telephone signalling network and finally route the call according to the resulting instructions. Specifically, in response to a call to an 800 number, SSP 30 fabricates a query in the form of a packet. This query contains the called 800 number and a request for a destination routing number associated with the dialed 800 number and a designation of a specific inter-exchange carrier, such as inter-exchange carrier 1 or 2, that is to carry this call. This packet also contains a network address of the SSP, i.e. SSP 30, that originated the query. Once this packet is generated, it is transmitted through a regional common channel signalling (CCS) network 50 to an appropriate SCP, such as SCP 200 or SCP 210, which processes the packet and provides an appropriate response. Every packet received by an SCP is part of a separate transaction. Every transaction includes both a packet sent to an SCP from an SSP and a corresponding response generated thereto by the SCP and sent to the SSP.

The CCS network consists of a multi-level hierarchy of signalling transfer points (STPs) which primarily act as packet switches to carry a message, in this case a packet, from an "originating" SSP to a particular "destination" SCP and to carry a packet containing a response message (call routing instructions) from that SCP back to the originating SSP which, in turn, routes the 800 call using the call routing instructions. As shown, CCS network 50 contains STPs 52, 54, 56 and 58 which are situated at different geographic locations within a given service region. STPs 52 and 54 receive incoming packets from SSP 30 for subsequent routing through the CCS network. As a result, these STPs function as "originating" STPs. To ensure continued operation in the event of a link failure, each originating STP is connected through two separate bi-directional links, such as links 64 and 72 for STP 52, and links 66 and 74 for STP 54, to destination STPs 56 and 58. If one of the links, such as link 64, connecting an originating STP, such as STP 52, fails, then that STP routes packets, via the other link—here link 72, to the other destination STP. Destination STPs 56 and 58 are inter-connected by bi-directional link 68 to route packets therebetween, if necessary. Hence, if STP 58 receives a packet destined for STP 56, the former STP routes the message over link 68 to the latter STP. Likewise, originating STPs 52 and 54 are inter-connected by bi-directional link 62 to route packets therebetween in the event of a link failure. Generally, CCS network 50 contains more than two originating and two destination STPs, and more than two STP levels wherein one or more levels of STPs are situated between the originating and destination STPs to provide packet routing therebetween. Each individual SSP, STP and SCP that exists within a signalling network is often referred to as a node.

Now, once SSP 30 formulates an query, this SSP routes the associated packet that contains this query and appropriate header information through an available link, such as link 36 or 38, to an originating STP, i.e. either STP 52 or 54, respectively, located within CCS network 50. The originating STP determines, using internal global title translation tables, an address of a particular SCP, such as SCP 200, which contains the appropriate databases necessary to provide the requested call routing instructions, i.e. the specific SCP which contains a copy of the customer record for the dialed 800 number. This address is then inserted as a routing field that forms part of the header of the packet. Thereafter, the packet is routed from the originating STP to a destination STP within CCS network 50. Each STP that receives this packet examines its routing field and routes the packet accordingly. Once the destination STP receives the packet, it routes the packet to the particular SCP specified within the header. The SCP performs associated database look-up operations to formulate the desired call routing instructions. After this has occurred, the SCP fabricates a packet that contains the call routing instructions as a response message and a header that specifies the address of the SSP that originated the original query. Once the SSP receives this packet, it routes the dialed 800 call according to the routing instructions, i.e. the SSP routes the dialed call to the specified destination routing number via a specified inter-exchange carrier, such as inter-exchange carrier 1 or 2, via respective trunks 32 or 34.

This signalling network that has just been described and which is well known in the art utilizes CCITT signalling system 6 (SS6). This signalling system employs only one physical path for each link that connects any two components (SSPs, STPs, and SCPs) that reside within or are connected to the signalling network.

Figure 2:
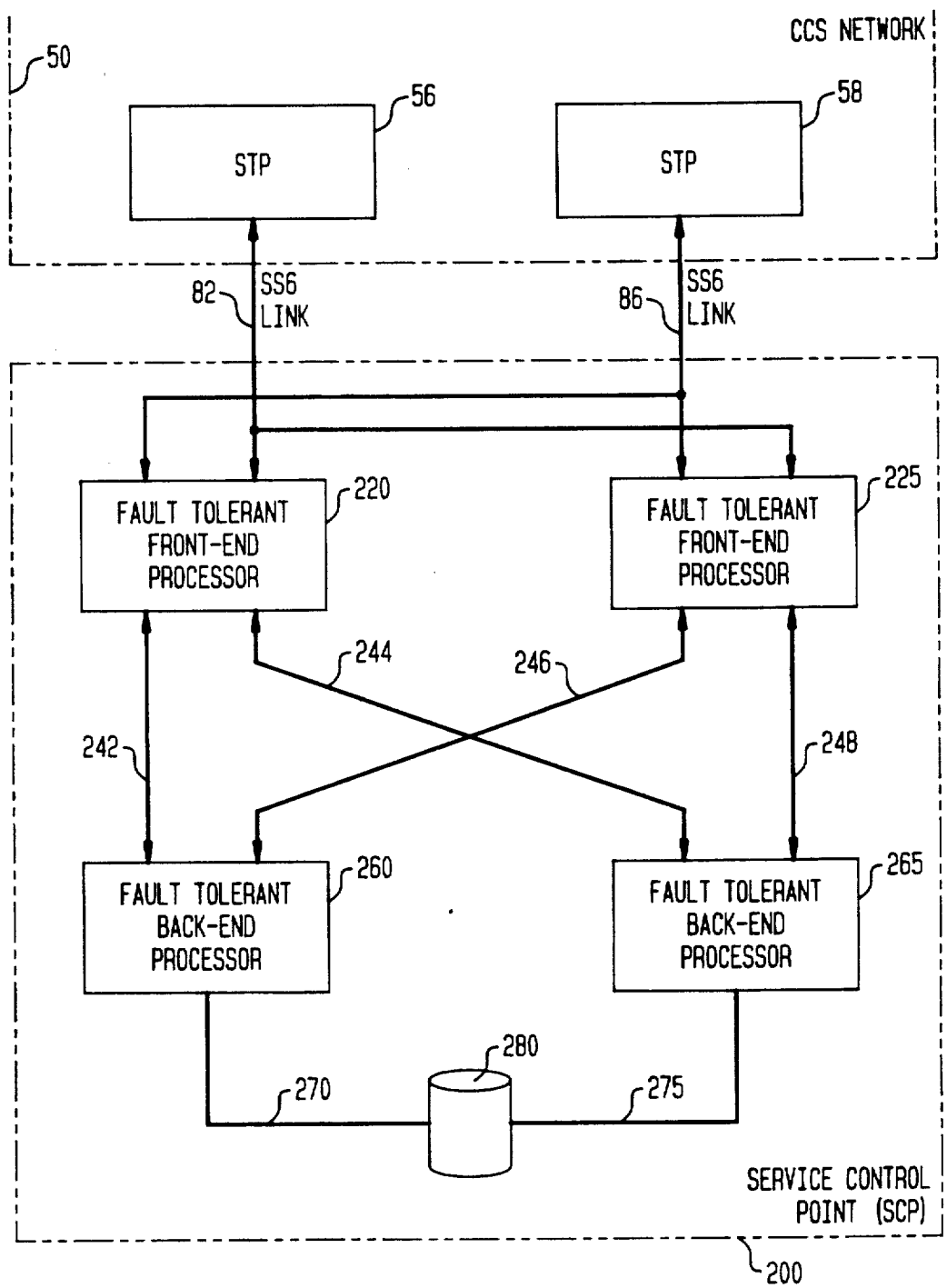
FIG. 2 is a block diagram of prior art service control point (SCP) 200 shown in FIG. 1.

With this in mind, FIG. 2 shows a block diagram of an SCP, illustratively SCP 200, that forms part of the prior art signalling network shown in FIG. 1.

As shown, the SCP contains two separate front end processors 220 and 225 each of which is connected to both links 82 and 86 which emanate from STPs 56 and 58, respectively. Each front end processor receives incoming packets and executes various software routines that implement a well-known communication protocol that forms part of SS6. This protocol provides framing, synchronization, error checking and correction, destination checking, message transport and other well-known communication functions. After the protocol has executed in a front end processor for an incoming packet, this processor sends the query contained in the incoming packet to a back end processor, such as processor 260 or 265, to process the query accordingly and provide a desired response. Query processing typically includes database look-up operations performed through path 270 or path 275 into a customer record stored on dual ported fault tolerant disk drive 280. The resulting response provided by the back end processor is then communicated back to the front end processor that provided the query. This front end processor executes the SS6 protocol to fabricate a packet containing the response and appropriate header information and then subsequently transmits the packet back to an STP.

Hardware redundancy and link redundancy are used to impart a necessary degree of reliability to the signalling network. Specifically, in the event one path fails, another is available; in the event, one processor fails, another is available. As shown, each SCP is connected, via two separate links—here links 82 and 86, to two different STPs. In this manner, CCS network 50 can still communicate with SCP 200 and process calls even if one of the STPs or links fails. If STP 56 or link 82 fails, then the packets that would otherwise be carried by these components are routed, via STP 58 and link 86, to the SCP. Also, within the SCP, both links are connected to both front end processors. Hence, if one of these processors fails, then the other front end processor can immediately take over the processing load of the failed processor. Additionally, each front end processor is connected through separate data links to both back end processors. In the manner, should either one of the data paths connecting a front end processor to a back end processor fail or should a back end processor itself fail, then queries can be routed through the other data link to a different back end processor for processing. Specifically, front end processor 220 is connected through bi-directional data paths 242 and 244 to back end processors 260 and 265. Likewise, front end processor 225 is connected through bi-directional data paths 246 and 248 to back end processors 260 and 265.

The art teaches that to provide added reliability, each of the front end and back end processors must be fault tolerant. Unfortunately, traditional fault tolerant processors known in the art possess serious drawbacks that significantly limit their use in an SCP. Specifically, traditional fault tolerant processors disadvantageously: utilize, typically in a hot/standby configuration, separate high throughput processing elements that are quite expensive; utilize complex, sophisticated and relatively expensive software; and/or might, depending upon the specific fault tolerant processor chosen, employ tight inter-processor coupling which decreases overall system reliability.

II. Inventive Fault Tolerant Transaction Processing System

Now, in accordance with the teachings of the present invention, a real-time fault tolerant transaction processing system, particularly suited for use in an SCP, can be fabricated which substantially eliminates the drawbacks associated with traditional fault tolerant systems.

The inventive system relies on using a communication protocol, illustratively signalling system 7, that adaptively distributes traffic on an approximately equal basis over multiple physical links that connect two points, coupled with use of non-fault tolerant front end and back end processors that are connected to each physical link for handling the processing of packets appearing on that link, wherein all the front and back end processors are loosely coupled together for purposes of processor synchronization and re-assignment. Through this system, all the physical links simultaneously carry an approximately equal number of packets which are, in turn, processed by all the processors connected thereto. In the event any physical link or either a front or back end processor connected thereto fails, then that link is declared to be out of service. As a result, the protocol merely re-assigns all subsequent traffic to the other links until such time as the fault is cleared. As the result of link re-assignment, there is advantageously no need to connect a fault tolerant processor to each physical link.

Moreover, to provide increased fault tolerance, the inventive system employs "$j+1$" sparing in which $j+1$ processors (where $j$ is an integer) are used in situations that would normally require $j$ processors. Specifically, if only three physical links are sufficient to carry expected traffic, then four physical links with accompanying front and back end processors would be used in lieu of three physical links with the protocol providing approximately equal traffic (packet) distribution among the four links. Since use of an extra link and an extra set of processors is far less expensive than completely duplicating the entire system hardware as has been done in the past to provide fault tolerance, use of "$j+1$" sparing results in a substantially less expensive fault tolerant processing system than has been taught in the art.

Furthermore, since no processors (either front or back end) are normally in an idle state but instead all such processors are productively processing packets, then advantageously little processing capacity is wasted, at least far less than that associated with traditional fault tolerant processors that rely on using separate hot/standby processors. Moreover, since the processors used in the inventive system non-fault tolerant and have a smaller processing capacity than those typically associated with fault tolerant architectures, use of these non-fault tolerant processors results in a fault tolerant architecture that is substantially less expensive than that previously possible. In addition, since the all the front and back end processors are loosely coupled together and a single back end processor can selectively bring up or take down subsystem (application) processing in each corresponding front/back end processor pair located within an entire SCP, the software that co-ordinates all the front and back end processors in the inventive system is far less sophisticated than that associated with traditional fault tolerant architectures. This, in turn, further reduces the cost of providing a fault tolerant real-time transaction processing system according to the teachings of the present invention.

Inasmuch as the inventive communication system utilizes a communication protocol along with particular hardware and software, the discussion will now address the salient properties of the protocol before proceeding to a detailed examination of the hardware and software used in the inventive system.

A. Communication Protocol

The protocol used in the inventive communication system provides point-to-point communication between different nodes—such as between an SSP and an STP, between separate STPs, and between and STP and an SCP—existing within CCS network that forms a telecommunications signalling system. This protocol, hereinafter referred to as signalling system 7 (SS7), is the ANSI (American National Standards Institute) implementation, as recommended by the ANSI T1X1.1 Working Group, of the signalling system 7 standard initially promulgated by CCITT. This protocol includes mechanisms, such as error detection and correction, to insure reliable transfer of signalling information, between two points in a CCS network, in the presence of transmission disturbances or a network (link or node, e.g. STP or SCP) failure. This protocol, as described in detail below, connects each pair of nodes with a number of separate signalling links, specifically up to sixteen separate links, that collectively form a link set. In the case of a link failure, the protocol diverts and distributes traffic from a failed link in the set to and among all the remaining links in the set. The software that implements SS7 executes in every node within the network in order to reliably transfer messages therebetween.

One type of transmitted message that appears on the network is a packet consisting of a message signal unit (MSU) that contains desired signalling information (application information) followed by various header and trailing fields. Two other types of messages, i.e. a link status signal unit (LSSU) and a fill-in signal unit (FISU) can also, under certain circumstances, be transmitted onto the network by a node and are discussed below. The structure of an MSU is depicted in Table 1 below. The number in parenthesis in each of the following tables specifies the associated number of bits in each corresponding field.

TABLE 1

MESSAGE SIGNAL UNIT (MSU) STRUCTURE

| F | CK | SIF | SIO | — | LI | FIB | FSN | BIB | BSN | F |
|---|---|---|---|---|---|---|---|---|---|---|
| (8) | (16) | (8n,n≧2) | (8) | | (2) | (6) | (1) | (7) | (1) | (7) | (8) |

→ first bit transmitted where:
F is a message delimiter flag;
CK are check bits;
SIF is a signalling information field;
SIO is a service information octet;
LI is a length indicator field;
FIB is a forward indicator bit;
FSN is a forward sequence number;
BIB is a backward indicator bit; and
BSN is a backward sequence number.

Specifically, each MSU begins and ends with a unique 8-bit pattern, illustratively "01111110", called a message delimiter flag (F). Appropriate routines executing at level 2 of the protocol prevent data from being interpreted as a delimiter flag by stuffing a "0" bit into a data pattern at the end of any consecutive string of five "1" bits in that pattern. Sixteen check (CK) bits are provided at the end of every MSU. For each MSU, the values of these check bits (a cyclic redundancy code) are generated by a transmitting node by computing a well-known frame check polynomial on portions of the MSU (flag and check bits excluded) prior to transmitting that MSU. Upon receipt of that MSU at a receiving node, the receiving node locally generates the check bits by computing the same polynomial and then compares the values of the locally generated check bits against those embedded within the received MSU. If any discrepancy is found between the values of the received and locally generated bits, then transmission errors are assumed to exist. As a result, the receiving node discards the received MSU and provide either a negative or no acknowledgement of receipt. This causes the transmitting node to re-transmit this MSU, as discussed below.

The signalling information field (SIF), as described in detail below in conjunction with Table 2, contains an application message, in this case for 800 service a query from an SSP to an SCP or a response therefrom to an SSP, and a routing label. The routing label, as discussed in detail below in conjunction with Table 2, specifies the network origination and destination addresses of the MSU along with a code specifying the specific link within a link set that is to carry the MSU. The signalling information field contains an integral number of octets (8-bit groups) greater than or equal to 2 and less than $272^2$. The specific format and content of the application message is defined by the specific application software, i.e. the 800 service software.

The service information octet (SIO) is an 8-bit code used by level 3 of SS7 to distinguish between different message types and different label types and thereby assist in routing a message to an appropriate application.

The length indicator (LI) is a binary number within the range 0–63 which specifies the number of octets that follow the length indicator bits and precede the check bits.

The forward (FIB) and backward (BIB) indicator bits along with the forward and backward sequence numbers (FSN and BSN, respectively) are used to perform sequence control and acknowledgement of transmitted MSUs. Specifically, each MSU is sequentially numbered in a cyclical sequence running between 0 and 127. The forward sequence number is the sequence number of a message contained within the present MSU that is being transmitted. The backward sequence number is a sequence number associated with an MSU that has been previously received, by the node that is now transmitting, from the node that is now receiving and is now being acknowledged to that receiving node.

As discussed above, the signalling information field (SIF) not only contains an application message required by the 800 service application executing within a destination SCP but also contains a routing label. This label is utilized by the message distribution, discrimination and routing functions within level 3, as discussed below, to route, an MSU to a proper application, such as 800 service, that executes within a specified SCP. The routing label, for use within the United States CCS network, takes the form shown in Table 2 below:

TABLE 2
ROUTING LABEL STRUCTURE

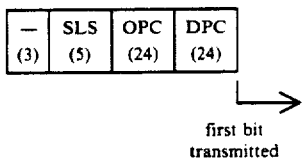

first bit transmitted where:
SLS is a signalling link selection code;
OPC is an originating point code; and
DPC is a destination point code.

The signalling link selection code is a five bit code used in sharing traffic among two different link sets emanating from a node and within different links that form each of these link sets. The purpose of load sharing is to ensure that individual links and STPs do not become overloaded. All signalling points in a network use the same procedure for load sharing. Specifically, the least significant bit in the SLS specifies which of two link sets emanating from a node is to carry the MSU with the remaining four bits designating the particular link within the specified set. Prior to transmitting the MSU, the node rotates the SLS and places the value of the most significant bit into the least significant bit position. The receiving node then uses the value of the bit now occupying the most significant bit position to select one of two link sets with the remaining four bits used to select a specific link within that set and so on for all subsequent nodes that will receive the MSU. As a result, information that determines load sharing at any node in the network is independent of information used at any previous node. In the event a link in a link set fails, then the protocol load-shares the traffic (MSUs) that would otherwise be carried by the failed link over the remaining links in the link set. This is accomplished by re-assigning the signaling link selection codes that were previously assigned to the failed link to the remaining links in the link set. Messages are routed on the network through pre-defined (static) routing paths that are adaptively changed in the presence of node or link failures or link congestion, as explained below.

The originating and destination point codes are CCS network addresses of the origination and destination sites of the associated MSU. Both CCS network addresses, OPC and DPC, take the form shown in Table 3 below:

TABLE 3
ORIGINATION/DESTINATION POINT CODE
(OPC/DPC) STRUCTURE

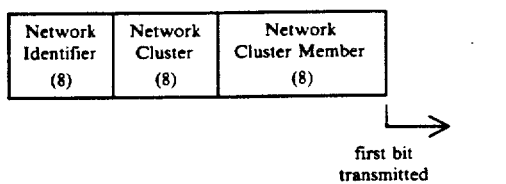

first bit transmitted

The network identifier field contains a code that identifies a specific CCS network to which a DPC/OPC belongs. The network cluster field, when used, defines a cluster of nodes within the specified network. Lastly, the network cluster member field contains a code that specifies a specific node within a specific cluster. The network cluster member code "00000000" is used to address STPs that form any specific cluster.

Figure 3:
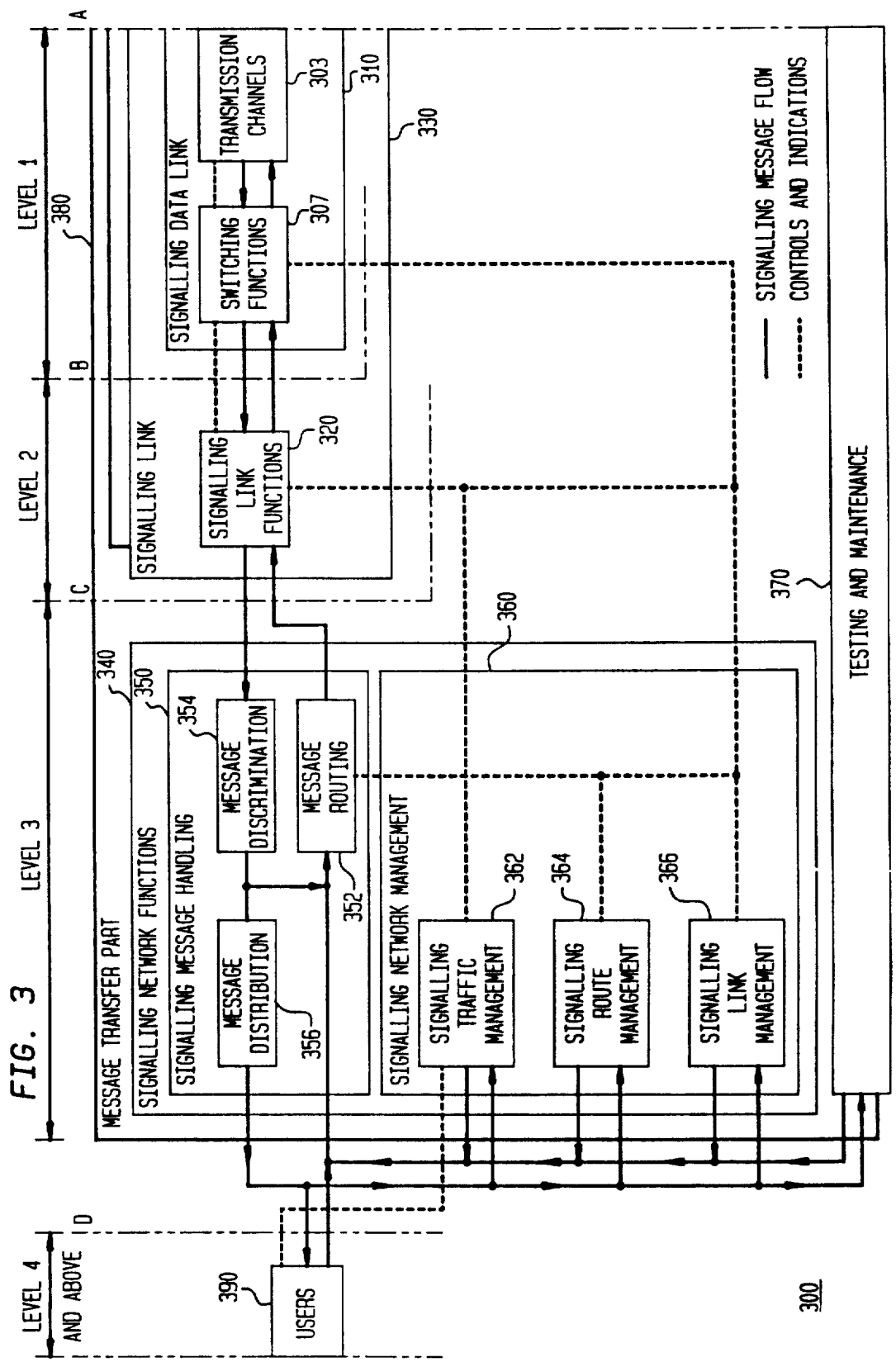
FIG. 3 graphically depicts the hierarchy of the various levels of signalling system 7 (SS7) associated with a node on the common channel signalling (CCS) network and the message and control flow that occur among these levels.

A graphical depiction of hierarchy 300 of the various levels of SS7 existing at each node on the CCS signalling network and the message and control flow that occurs among these levels is shown in FIG. 3. Dot-dashed line A represents that a mirror image of hierarchy 300 exists in a companion node on the CCS network. As shown, SS7 utilizes a number of distinct levels: signalling data link functions 310 (level 1), signalling link functions 320 (level 2), signalling network functions 340 (level 3) and user levels 390 (level 4 and higher). The first three levels form message transfer part 380 which collectively provides a transport system to reliably transfer MSUs between different nodes and/or different applications, of which 800 service is one such application, residing at one or more nodes. Here, specifically, a portion of the 800 service which generates queries and processes responses to route calls to a specific destination routing number, resides within an SSP and the remainder which performs database access operations resides within an SCP. An SSP and SCP may, though often do not, reside at the same geographic site. Since each node in the communications network can transmit and receive SS7 messages, every node executes identical software that implements levels 1, 2 and 3 of the SS7 protocol in order to reliably transfer messages among these nodes.

In essence, level 1, signalling data link 310, defines physical, electrical and functional characteristics of an actual signalling link, i.e. transmission channel 303, and a specific transmission method, i.e. switching functions 307, through which the link is accessed. Level 1 exists between dot-dashed lines A and B. Generally, such a link is a 56 or preferably 64 kbit/second synchronous digital path. As such, level 1 is implemented in hardware. Each higher level is implemented in software with each task executing within that level being implemented through one or more subroutines. The content and organization of each of these subroutines are readily apparent to those skilled in the art.

Level 2, signalling link functions 320, define various tasks (that invoke pre-defined functions and procedures) relating to the transfer of individual MSUs over an individual signalling data link (transmission channel) that has been defined in level 1. These functions include: MSU delimitation and MSU alignment, error detection, error correction, initial alignment, error monitoring and flow control of MSUs being transmitted through the link. Level 2 exists between dot-dashed lines B and C. Specifically, based upon the detection of delimiter flags (F), level 2 tasks determine the beginning and end points of an MSU. Level 2 tasks also stuff "0" bits into a data stream after the occurrence of five "1" bits to prevent any data from imitating a delimiter flag. As set forth above, upon receipt of an MSU, level 2 tasks also locally generate, 16 check bits, through computing the frame check polynomial, and compares the locally generated bits to the check bits embedded within the received MSU. If a discrepancy is detected between these two groups of check bits, then level 2 tasks discard the received MSU through use of a negative or no acknowledgement messages which, in turn, cause the transmitting node to re-transmit the discarded MSU.

Level 2 of SS7 provides non-compelled, positive/negative acknowledgement with re-transmission error correction. Specifically, once an MSU has been transmitted over a link, a copy of that MSU is retained within a re-transmission buffer associated with that link and situated at a transmitting node until that node receives a positive acknowledgment (in the form of a backward sequence number) that the transmitted MSU has been received by a far end node connected to that link. If however a negative acknowledgement or no acknowledgement message is received within a prescribed time period, then the transmitting node ceases to transmit any new MSUs and re-transmits all MSUs, for which it has not yet received a positive acknowledgement, in the order these MSUs were first transmitted.

Initial alignment tasks, as described in detail below, are used in initializing a link, i.e. after a "switch-on" condition, or in aligning (synchronizing) a link after it has recovered from a link failure. These tasks utilize a compelled exchange of status information over the link between two nodes on the network during a pre-defined "proving" period.

Level 2 tasks also detect link failures by monitoring errors, specifically rates of signalling errors and losses of alignment on a link and the length of time during which each loss of alignment occurs.

Flow control of MSUs transmitted down a link is another function provided by tasks executing within level 2. Specifically, whenever link congestion (periods of heavy traffic) is detected at a receiving node connected to a link, the receiving node notifies the transmitting node connected to that link by an appropriate status code existing within a link status signal unit (LSSU), as discussed in detail below, and then withholds acknowledging all MSUs that have been received but not yet acknowledged. In particular, the LSSU is transmitted by the receiving node down that link to the transmitting node. In response to the receipt of this LSSU the transmitting end does not send any further MSUs to the receiving end over this link. Thereafter, the receiving node periodically notifies the transmitting node of the condition of the link. If this congestion continues too long, then the transmitting node designates this link as having failed and routes traffic to other links accordingly. Alternatively, if the congestion abates, then the receiving node resumes acknowledging received MSUs. Lastly, level 2 tasks also control link recovery.

Signalling network functions 340, which collectively form SS7 level 3, define tasks (here transport functions and corresponding procedures) that are common to and independent of the operation of individual signalling links. Level 3 exists between dot-dashed lines C and D. Level 3 tasks typically fall into two broad categories: signalling message handling task 350 and signalling network management task 360.

Specifically, while an MSU is being transferred over the network from an application executing at an originating node, signal message handling task 350, in response to the routing label within that MSU, directs that MSU to an application within SS7 level 4 or higher at a destination node. The delivery of the MSU is made either through a link that directly connects the originating and destination nodes or via one or more intermediate STPs. Signalling message handling task 350 consists of three sub-tasks: message routing task 352, message discrimination task 354 and message distribution task 356. Message routing concerns MSUs that are to be transmitted to other nodes; while message discrimination and distribution concerns MSUs that have been received. If an MSU containing an application message is to be sent from an application executing at level 4 or higher to another node on the network, then message routing task 352 at the originating node utilizes the SLS field within the routing label situated in the MSU to determine an outgoing link on which this MSU should be transmitted onward towards its destination. Message discrimination task 354 is used at a node to determine whether or not a received MSU, based upon its routing label, is destined for this node. If the received message is destined for another node, then task 354 applies that MSU to message routing task 352 for re-transmission to its eventual destination node. Alternatively, if the MSU is destined for the present node at which it has been received, then message discrimination task 354 applies that MSU to message distribution task 356. This latter task separates the application message from the received MSU and directs it to the proper application, here 800 call service, executing at this node such as an SCP.

Signalling network management task 360, based upon pre-defined data and information regarding the status of the individual links and nodes that form the network, controls current routing of MSUs appearing on the network and also the configuration of the network links and nodes. Should any change occur in the status of the network, such as the failure of a link or node or congestion of a link, then signalling network management task 360 re-configures the network to by-pass the failed or congested link or failed node and thereby preserve communication over the network by sending messages to all nodes, particularly STPs, in the network to change routing tables used by message routing task 352 within each such node. In certain circumstances, this may entail activating and aligning new links that connect two nodes to provide signalling capability between these nodes. When normal operating conditions resume on this link or node, task 360 restores normal MSU transfer capability thereto.

Specifically, signalling network management task 360 contains three sub-tasks: signalling traffic management 362, signalling route management 364 and signalling link management 366. Signalling traffic management task 362 diverts traffic from a link or route and routes it to one or more different links or routes, respectively, in the event of a link or node failure or slows traffic entering a given link if congestion occurs. This sub-task provides the functions of changeover (diversion of traffic without loss of messages to alternate links), changeback (acceptance of traffic into a recovered link), forced re-routing (used when a signalling route becomes unavailable), controlled re-routing (used to route traffic to a signalling route that has just become available), management inhibiting (manual instruction, by e.g. a craftsperson or technician, to the network to inhibit a link) and signalling traffic flow control. Signalling route management task 364 distributes status information throughout the network in order to block or unblock specific signalling routes. This information includes those routes that are transfer-restricted, transfer-prohibited, transfer-allowed, and transfer-controlled. Signalling link management task 366 restores failed links and/or link sets, activates idle though not yet aligned links and/or link sets, and deactivates aligned links and/or link sets.

As shown in FIG. 3, the different tasks provided at level 3 interact with each other and with various tasks existing at levels 2 and 4. Various standard testing and maintenance tasks 370 also exist which can be invoked through appropriate level 3 messages to test various aspects of the network.

Levels 4, user (application) level 390, and above define specific user applications, such as the 800 service, that utilize information provided within the SIF field situated in an MSU. The application levels exist to the left of dot-dashed line D. Hence, levels 1, 2 and 3 collectively define a communication network that here reliably exchanges information, here transactions specifically queries and responses, between the same user application, 800 service, typically situated at different geographic sites. Specifically, levels 1, 2 and 3 define the network which carries queries from originating SSPs at various sites to destination SCPs and each resulting response from the destination SCP back to its corresponding originating SSP. Clearly, by merely changing the routing label, specifically the value of the service information octet within the MSU, this network can be used to exchange information between different user applications executing at one or more sites.

Two additional types of messages, link status signal units (LSSUs) and fill-in signal units (FISUs), can also be transmitted over a link. LSSUs indicate status of the link and play a role in aligning a link to the network and passing failure messages regarding that link to the network. The organization of an LSSU is shown in Table 4 below.

TABLE 4

LINK STATUS SIGNAL UNIT (LSSU) STRUCTURE

| F | CK | SF | — | LI | FIB | FSN | BIB | BSN | F |
|---|---|---|---|---|---|---|---|---|---|
| (8) | (16) | (8 or 16) | (2) | (6) | (1) | (7) | (1) | (7) | (8) |

→ first bit transmitted where:

is an 8 or 16 bit status field that contains a code specifying the status of the link.

Specifically, whenever a node, such as an STP or SCP, is fully operational and therefore ready to be brought into service on the network, a link connecting this node to the remainder of the network must undergo alignment. At this point, each node connected to the link repetitively transmits LSSU messages through the link to the other node connected thereto. In particular, whenever either node is ready to undergo alignment, then this node toggles, once a second, the code in the status field in the LSSU it is repetitively transmitting between a value indicative of "out of alignment" and a value indicative of "out of service". Once both nodes have detected a toggling status code transmitted by the other node, then both nodes begin an alignment procedure. This procedure, which typically lasts approximately 11.8 seconds, involves sending a pre-defined serial alignment bit stream four times over this link from each node to the other node. If this stream is received without any errors by each node, then each node connected to that link undertakes a level 3 application test, i.e. a so-called signal link test. This test is typically issued from an STP to an SCP and at the same time from an SCP to an STP. Specifically, a special pre-defined MSU is sent by, for example, the STP and contains a pre-set message and a routing label for a specific destination, such as the specific SCP. Whenever this SCP receives this message, it must acknowledge receipt. If the routing label is wrong, typically indicative of improper network addresses caused by faulty initialization of an STP or SCP, then no acknowledgement will be sent. In this case, the receiving node will wait for approximately one second for the acknowledgment. If such an acknowledgement is not received during this one second interval, then the receiving node (SCP or STP) will repeat the test. If the second attempt also fails, then this node categorizes this link as being out of service. As a result, the receiving node then repetitively transmits LSSUs onto this link with the status field set to the code for "out of service". As soon as either node connected to this link is ready to attempt alignment, it then transmits LSSUs with toggling status codes and the above process repeats. Alternatively, in the event a proper acknowledgement is received by a node, then this node changes the status of that link to available and then repetitively sends FISU messages, as described below, until MSUs are ready to be transmitted. Now, if the link fails for any reason or a node is not able to attempt alignment, such as for example through an STP failure, a back end processor failure in the SCP or a physical failure of the link itself or congestion on the link, then each node connected to that link transmits LSSU messages with the status field set accordingly to, for example, a code specifying "out of service", "out of alignment", "processor failure" or "signalling link out of service" depending upon the specific failure.

If no other messages, such as MSUs, are awaiting transmission between two nodes connected by an aligned and available link on the network, then each of these nodes repetitively transmits FISUs over the link to the other node in order to maintain an available aligned connection between these two nodes. Table 5 shows the structure of a FISU. A FISU contains no SS7 level 3 messages. The length indicator LI, is used to differentiate between three different types of messages that can appear on the network: MSUs (the value of the LI bits>"2"), link status signal units (the value of LI bits="1" or "2") and fill-in signal units (the value of LI bits ="0"). Unlike MSUs, both LSSUs and FISUs are not re-transmitted in case of a detected transmission error.

TABLE 5

FILL-IN SIGNAL UNIT (FISU) STRUCTURE

| F | CK | — | LI | FIB | FSN | BIB | BSN | F |
|---|---|---|---|---|---|---|---|---|
| (8) | (16) | (2) | (6) | (1) | (7) | (1) | (7) | (8) |

→ first bit transmitted

Oftentimes signalling traffic becomes quite heavy on a given link with more messages being destined for transmission over that link than the link is able to carry in a given time. When this occurs, the link basically becomes congested with a concomitant increase in transmission times. In these cases, SS7 is notified of a congested condition by a receiving node connected to that link. As long as congestion continues, signalling traffic is diverted from the congested link. Specifically, each MSU is assigned a priority value within the application portion of that MSU. Priority values can take on any integer value between "0" and "3", with "3" being the highest priority and reserved for signalling network management messages—a network message that is carried in lieu of an application message within an MSU. The amount of congestion occurring on that link, i.e. determined by the number of non-acknowledged MSUs contained in a re-transmission buffer for a link at a transmitting node, specifies the level of congestion occurring on that link. In the event, an MSU having a priority lower than the current congestion level occurs, then the transmitting node will send that message over an available link having a lower congestion level than the congested link. If, alternatively, the message has a priority greater than or equal to the congestion level of the congested link, then that message will be transmitted over the congested link.

Changeover procedures are embedded within SS7 to ensure that signalling traffic that would otherwise be carried over an unavailable link or link set is diverted to other available links within the same or a different link set as quickly as possible while avoiding message loss, message duplication or message mis-sequencing. Once a link has failed, either node connected to that link and which first detects the failure, e.g. an originating STP, a destination SCP or an intermediate STP connected to that link, can invoke a changeover procedure at its associated originating STP to divert traffic away from the failed link. To do so, each node that detects the failure transmits a changeover message. This message is a specific network management message. In general, network management messages (which, as discussed above, are embedded as application messages within an MSU) take the form of:

TABLE 6

NETWORK MANAGEMENT MESSAGE STRUCTURE

| — | FSN of last MSU accepted | link ID | Functional Code | Header |
|---|---|---|---|---|
| (5) | (7) | (4) | (8) | (56) |

→ first bit transmitted where:
Header is a pre-defined 56 bit routing code for a particular STP;
Functional code specifies a particular network management function that is to be executed within signalling network management task 340; such as among others: changeover (COO) and changeback, emergency changeover, changeover acknowledge (COA), transfer-controlled (TFC), transfer-prohibited (TFP), transfer-allowed (TRA), transfer-restricted (TFR), and management inhibiting;
Link ID is a four bit code that specifies the particular link which has failed within the link set running from the destination SCP (or intermediate STP) to the STP; and
the FSN is that associated with the last MSU that has been received by the destination SCP (or intermediate STP) prior to link failure.

Now, once the changeover message is received and acknowledged to a detecting node through transmission of a changeover acknowledge (COA) message, changeover commences. The changeover procedure involves updating and retrieving messages from transmission and re-transmission buffers on either side of a failed link, then diverting these messages, via other links or STPs, to nodes connected through available links for communication between the originating and destination nodes, and finally preventing any subsequent traffic from being generated for transport over the failed link.

Specifically, this updating includes identifying, using forward sequence numbers, all messages that have not been acknowledged and are located in the re-transmission buffer associated with the failed link. This is done through well-known handshaking procedures between both nodes connected to the unavailable link. Retrieval consists of transferring these non-acknowledged messages to the re-transmission buffers for the available link and located within a pair of nodes connected thereto. Alternate routes are selected based upon network configuration information and current link status information located within tables associated with signalling route management task 364 within level 3 of SS7. If no alternate routes exist to replace a failed link between two nodes, then signalling network management task 360 executing within the originating node declares the destination node to be inaccessible. In this case, network management messages (e.g. transfer prohibit messages) are sent back through the network to all nodes that can generate messages in order to specify the failed link as being blocked. These messages also instruct the nodes connected on either side of the failed link to discard any messages for the destination node and stored within transmission and re-transmission buffers associated with the failed link. Furthermore, these messages cause a command to be sent to each application (subsystem)

executing within every node to prohibit that application from generating any messages for the destination node. In addition, appropriate well-known procedures are executed within signalling link management task 366 to update the current configuration of the network given the location of the failed link and/or inaccessible node.

For a more detailed explanation of SS7, the reader is referred to the following material, which is incorporated by reference herein: Bell *Communications Research Specification of Signalling System 7*, Technical Reference TR-NPL-000246, Issue 1, Volume 1, 1985 (©1985, Bell Communications Research); and M. G. Walker, "Get inside CCITT signalling system No. 7", *Telephony*, Mar. 10, 1986, pages 72-77. Since this concludes the discussion of the salient features of the SS7 communication protocol as it pertains to the inventive system, the description will now turn to a detailed explanation of the hardware used in the inventive system followed by such a description of the software.

B. System Hardware

The hardware that forms the inventive real-time fault tolerant transaction processing system utilizes a CCS network, similar to that existing in the art but which has been modified to implement SS7, and a new architecture for each SCP appearing in this network. With this in mind, the discussion will now describe the signalling network followed by the SCP.

1. Signalling Network

Figure 4:
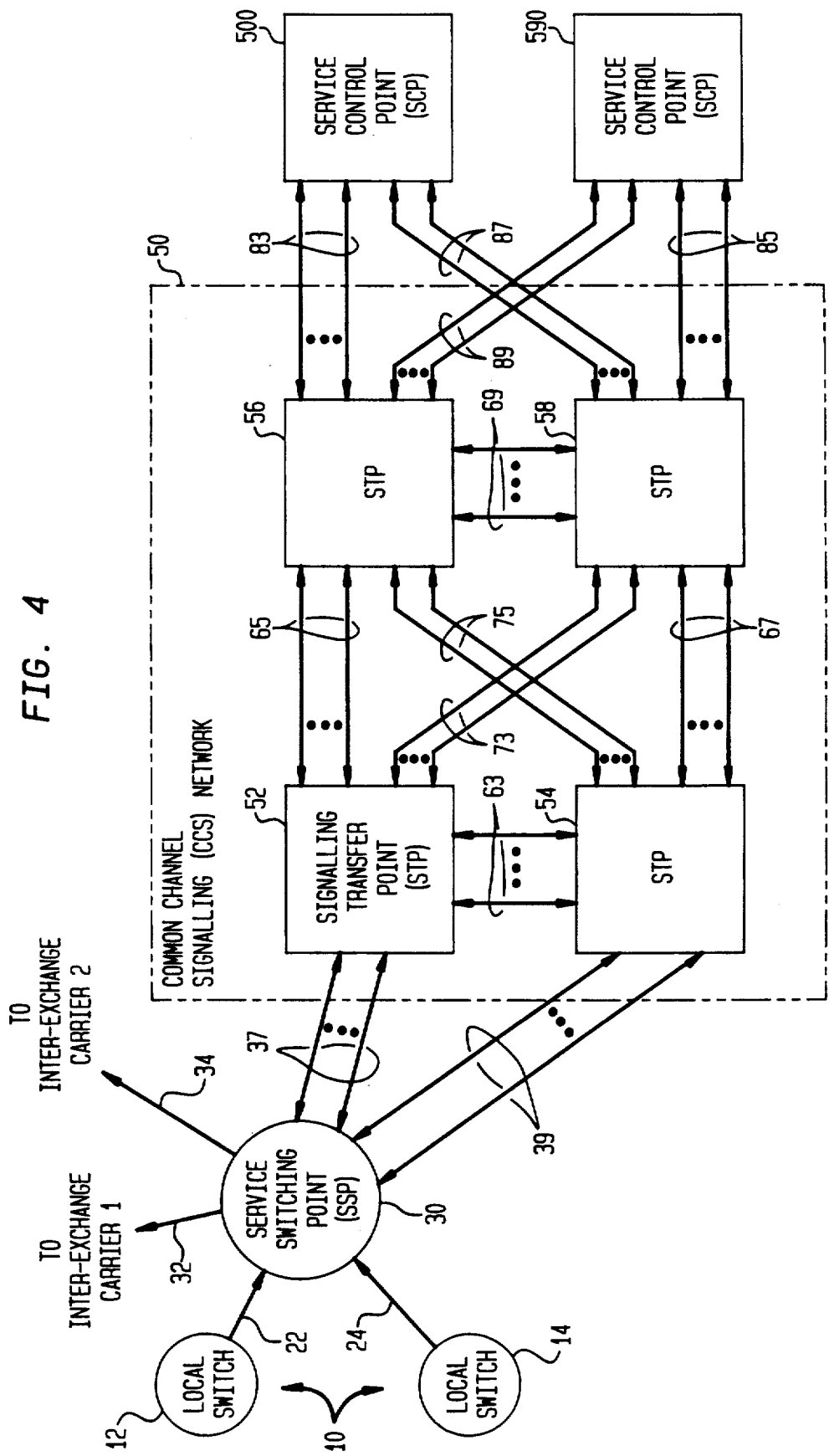
FIG. 4 is a simplified diagram of the architecture of the telephone signalling network shown in FIG. 1 that has been modified to utilize SS7.

The signalling network that is used in the inventive system is based upon and contains the same hierarchy of inter-connected nodes as a signalling network existing in the art, such as for example the network shown in FIG. 1, but with a modification required by SS7. Such a modified signalling network is depicted in simplified form in FIG. 4. As evident from this figure, the modified signalling network utilizes the same hierarchy of an SSP, connected to a CCS network that contains various levels of inter-connected STPs which are, in turn, connected to various SCPs. As discussed above, the existing signalling network shown in FIG. 1 utilizes SS6 in which only one physical link inter-connects any two different nodes. However, to accommodate SS7 and specifically to provide requisite link redundancy required by the SS7 protocol as discussed above, each pair of nodes that can pass signalling traffic therebetween (STPs within the CCS network, and SSPs and SCPs connected thereto) must be connected through a link set that contains more than one and up to sixteen separate physical bi-directional links. Therefore, as shown in FIG. 4, the SSP is Inter-Connected by link sets 37 and 39 to respective originating STPs 52 and 54 within CCS network 50. Within CCS network 50, originating STPs 52 and 54 are themselves inter-connected by link set 63 and are redundantly inter-connected to destination STPs 56 and 58 by link sets 65, 67, 73 and 75. STPs 56 and 58 are themselves inter-connected by link set 69 and are redundantly inter-connected to respective SCPs 500 and 590 by link sets 83, 85, 87 and 89. Each link set carries the same address. As noted above, selection of an appropriate link within a link set to carry an MSU is made by a node that is to transmit that MSU using the signalling link selection code, in the manner set forth above. Each node in the network is identified by one address although several link sets each containing a number of separate physical links are connected to that node.

The modified signalling network can and usually does, in actuality, contain multiple SSPs, inter-connected by a CCS network having more than four STPs organized in a multi-level hierarchy with originating, intermediate and destination STPs, and where each destination STP is connected to an associated SCP.

2. SCP Hardware Architecture

Figures 5, 5A:
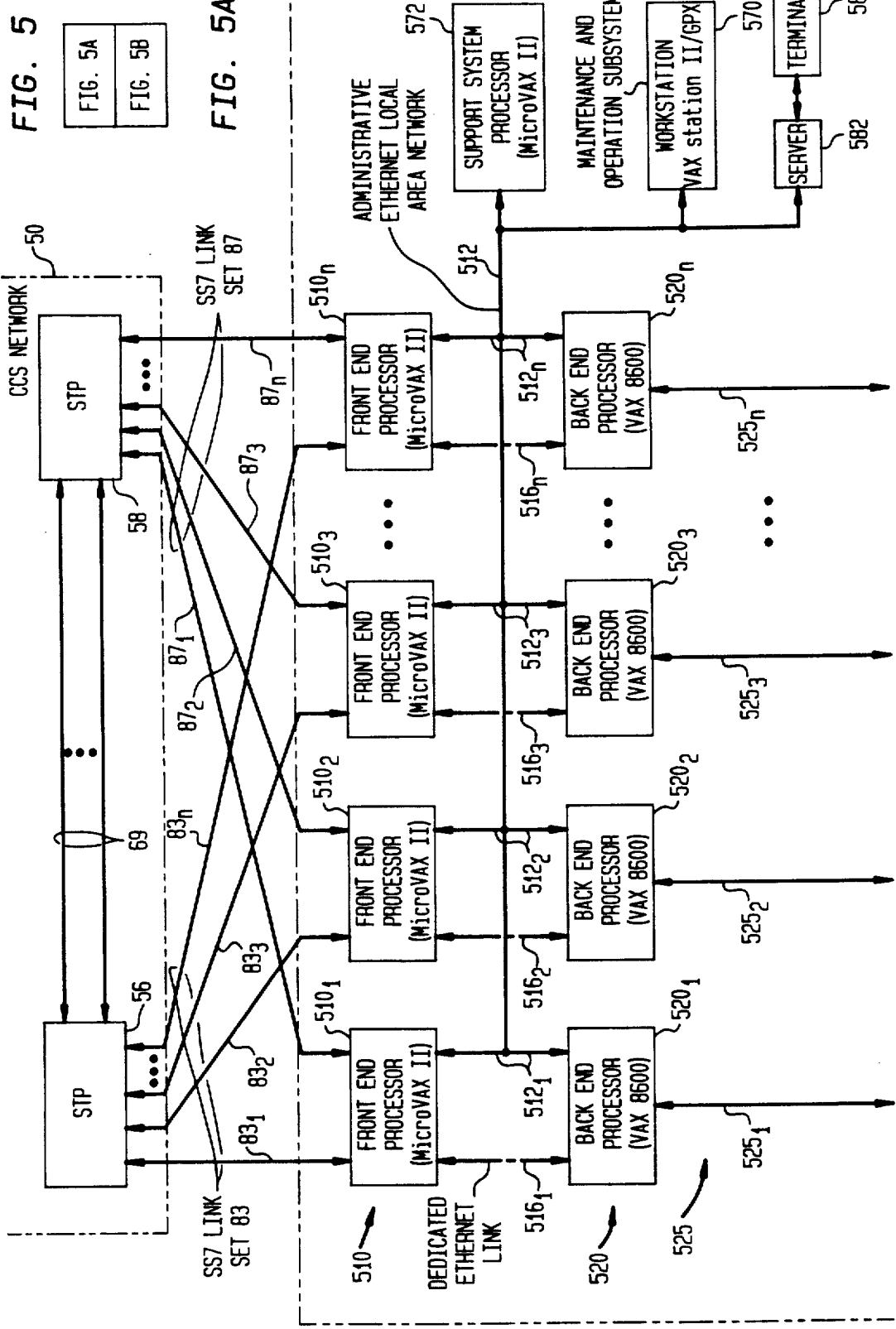
FIG. 5 shows the correct alignment of the drawing sheets for FIGS. 5A and 5B.
FIGS. 5A and 5B collectively depict a block diagram of a preferred embodiment of SCP 500 shown in FIG. 4 that incorporates the teachings of the present invention.
Figure 5B:
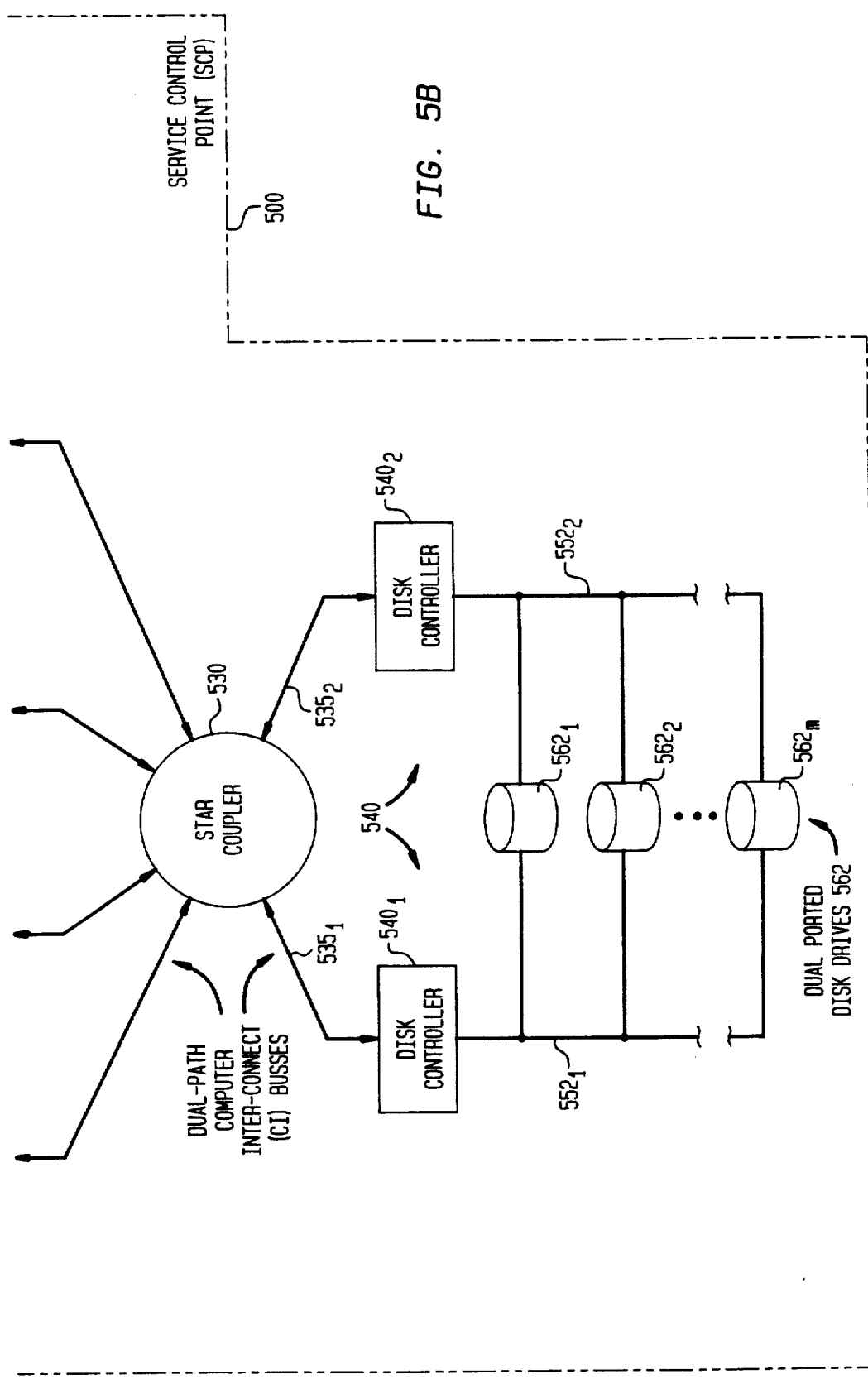

A block diagram of the inventive architecture of an SCP, illustratively SCP 500, is depicted in FIGS. 5A and 5B, for which the correct alignment of the drawing sheets for these figures is shown in FIG. 5.

The SCP contains a cluster of processors (inter-connected front and back end processors) that appear to the CCS network as a single node. Essentially, SCP 500 consists of from one to eight back end processors that execute queries using commonly available databases and provide responses. Each back end processor is connected to and communicates, via a corresponding front end processor, with the CCS network to receive individual queries and transmit responses. Each query is separately processed by a corresponding back end processor. One of the back end processors, in a manner to be described below in connection with the system software, co-ordinates the operation of all the front and back end processors so that individual front and/or back end processors as well as software, including application (subsystem) software, executing thereon can be gracefully brought into and out of service. As a result of this co-ordination, SCP 500 appears as a single node to the CCS network, specifically STPs 56 and 58, even though different messages (e.g. containing different queries) arriving on different links connected to the SCP may, in fact, be processed essentially simultaneously.

As shown and discussed above, SCP 500 is connected to STPs 56 and 58 by respective link sets 83 and 87. Link set 83 contains multiple links $83_1, 83_2, 83_3, \ldots, 83_n$. Link set 87 contains multiple links $87_1, 87_2, 87_3, \ldots, 87_n$ (where "n" $\leq 8$). Within SCP 500, every pair of corresponding links in both link sets is connected to a separate processor within front end processors 510. In this manner, each front end processor services incoming messages on two links. Specifically, front end processors 510 consist of front end processors $510_1, 510_2, 510_3, \ldots, 510_n$, which are in turn, respectively connected to links $83_1$ and $87_1$, $83_2$ and $87_2$, $83_3$ and $87_3$, $\ldots$, $83_n$ and $87_n$. The front end processors are all identical. Each front end processor, which will be discussed in greater detail below in conjunction with FIG. 6, contains a MicroVAX-II computer manufactured by Digital Equipment Corporation (which also owns the trademark "MicroVAX-II"). The front end processors execute layers 3 and below of the SS7 protocol including the message transfer part, and a signalling connection control part, which will be described in detail below.

Each front end processor is, in turn, connected through a well-known ETHERNET link (hereinafter referred to as a "dedicated" ETHERNET link) to a corresponding one of back end processors 520 (ETHERNET is a registered trademark of Xerox Corporation). Each dedicated ETHERNET link is shown using a dot-dashed line in order to distinguish this ETHERNET connection from administrative ETHERNET network 512 and its inter-processor connections, which will be discussed below. Specifically, front end processors $510_1, 510_2, 510_3, \ldots, 510_n$, are connected through ETHERNET links $516_1, 516_2, 516_3,$ ..., 516$_n$, on a one-for-one basis to back end processors 520$_1$, 520$_2$, 520$_3$, ..., 520$_n$, respectively. All the back end processors are identical with each consisting of a VAX 8600 processor which is also manufactured by Digital Equipment Corporation (which also owns the trademark "VAX"). Each of the dedicated ETHERNET links is controlled by appropriate communications software executing in both the front and back end processors connected to either side of the link. This communications software forms part of the DECnet family of communications products available from Digital Equipment Corporation (which also owns the registered trademark "DECnet"). All the application layers of SS7 are executed within the back end processors.

To process incoming queries for 800 calls, all back end processors 520 are able to commonly access disk resident databases containing customer records. Specifically, back end processors 520$_1$, 520$_2$, 520$_3$, ..., 520$_n$ are connected through individual paired busses, specifically high speed dual path computer inter-connect busses 525$_1$, 525$_2$, 525$_3$, ..., 525$_n$, through star coupler 530, to dual path computer inter-connect busses 535$_1$ and 535$_2$. The computer inter-connect busses are controlled by appropriate communications software executing within the back end processors and disk controllers and available within the DECnet family of communications products. These inter-connect busses, in turn, are connected to disk controllers 540 formed of disk controllers 540$_1$ and 540$_2$ Star coupler 530 is a well-known passive device that can be used to physically inter-connect up to sixteen high speed digital devices consisting of processors and disk controllers. Disk controllers 540$_1$ and 540$_2$ are each preferably model HSC50 available from Digital Equipment Corporation. Each of the controllers, specifically controllers 540$_1$ and 540$_2$, is connected through an appropriate bus, specifically bus 552$_1$ or 552$_2$, to one port of each disk drive 562$_1$, 562$_2$, ..., 562$_m$, that forms paralleled disk drivers 562 (where "m" is an integer greater than zero). These disk drives contain data files consisting of databases containing the necessary customer records sufficient to support 800 service as well as the necessary databases to support all other enhanced services, such as calling card, that might rely on remote processing provided by SCP 500. Each of the data files stored on the disks are arranged with multiple copies using a well-known "shadowing" technique to allow simultaneous access to multiple copies of the data and provide real time recovery in case of a failure of a disk drive, a disk itself or a disk controller. Multiple copies of the data files are also stored within each disk to improve access speed and provide increased system reliability.

All the front and back end processors are connected via separate ETHERNET local area network 512, which is referred to as an "administrative" ETHERNET local area network (LAN). This local area network permits communication to occur between the processors in order to provide synchronization and co-ordination therebetween. Specifically, administrative ETHERNET network 512 is connected to front and back end paired processors 510$_1$ and 520$_1$, 510$_2$ and 520$_2$, 510$_3$ and 520$_3$, ..., 510$_n$ and 520$_n$, via respective leads 512$_1$, 512$_2$, 512$_3$, ..., 512$_n$. This network uses the BX.25 protocol and is also controlled by appropriate communications software that forms part of the DECnet family of communications products. This network utilizes token passing. Specifically, a message is placed onto this network by a sending site, for example front end processor 510$_1$. This message is then picked up by an adjacent site on the network, e.g. front end processor 510$_2$. If the message is not for the latter front end processor but instead is destined for a downstream site, then the adjacent site that received the message, here front end processor 510$_2$, will place the message back onto the network for reception at the next adjacent site, i.e. front end processor 510$_3$ and so on. The message repeatedly appears on the network as the message travels from site to site. Whenever the message finally reaches its destination site, the message will not be retransmitted and hence effectively "pulled" off the network. As will be discussed below, the processors that form the SCP are synchronized and co-ordinated through certain so-called one-and-only one (O-O-O) processes, as described below, that execute on one of the back end processors at any given time. These processes executing on one back end processor, e.g. back end processor 520$_1$, communicate with all the other processes via administrative ETHERNET network 512. The communication generally involves application level commands to other back end processors to gracefully bring up or remove a certain application, such as 800 call processing, at other back end processors or invoke a mate switch operation, as described below, to another SCP. In addition, all the front end processors can also communicate to each other via administrative ETHERNET network 512. These communications, as described below, illustratively involve inquiries (changeover requests) regarding available links in the event of a link failure and accompanying acknowledgements (changeover acknowledgements) and other network management messages.

In addition, to provide a primary port through which craftspersons and/or technicians can locally manage the SCP, administrative ETHERNET network 512 is connected to maintenance and operations sub-system 570. This sub-system, typically a VAXstation II/GPX workstation produced by Digital Equipment Corporation (which also owns the trademark VAXstation II), is a multi-tasking workstation that is used to provide a system operator with simultaneous access to multiple processes executing within the SCP, such as status, configuration and re-configuration processes, performance data and alarm information. The information provided by sub-system 570 is displayed to a system operator. Similarly, the system operator can enter commands into SCP 500 through a well-known keyboard (not shown) that forms part of sub-system 570. Additionally, server 582 is connected to administrative ETHERNET network 512 to provide a simple interface for terminal 584 for communicating with any single task then executing within the SCP, e.g. run a single diagnostic within any processor or update a file and the like. Support system processor 572 is also connected to network 512 and is used to collect and disseminate, upon command, various SCP system statistics from each processor, such as utilization of each front and back end processor, number of failures of each such processor and/or each application and the like. Processor 572 is also a MicroVAX-II processor provided by Digital Equipment Corporation.

Figure 6:
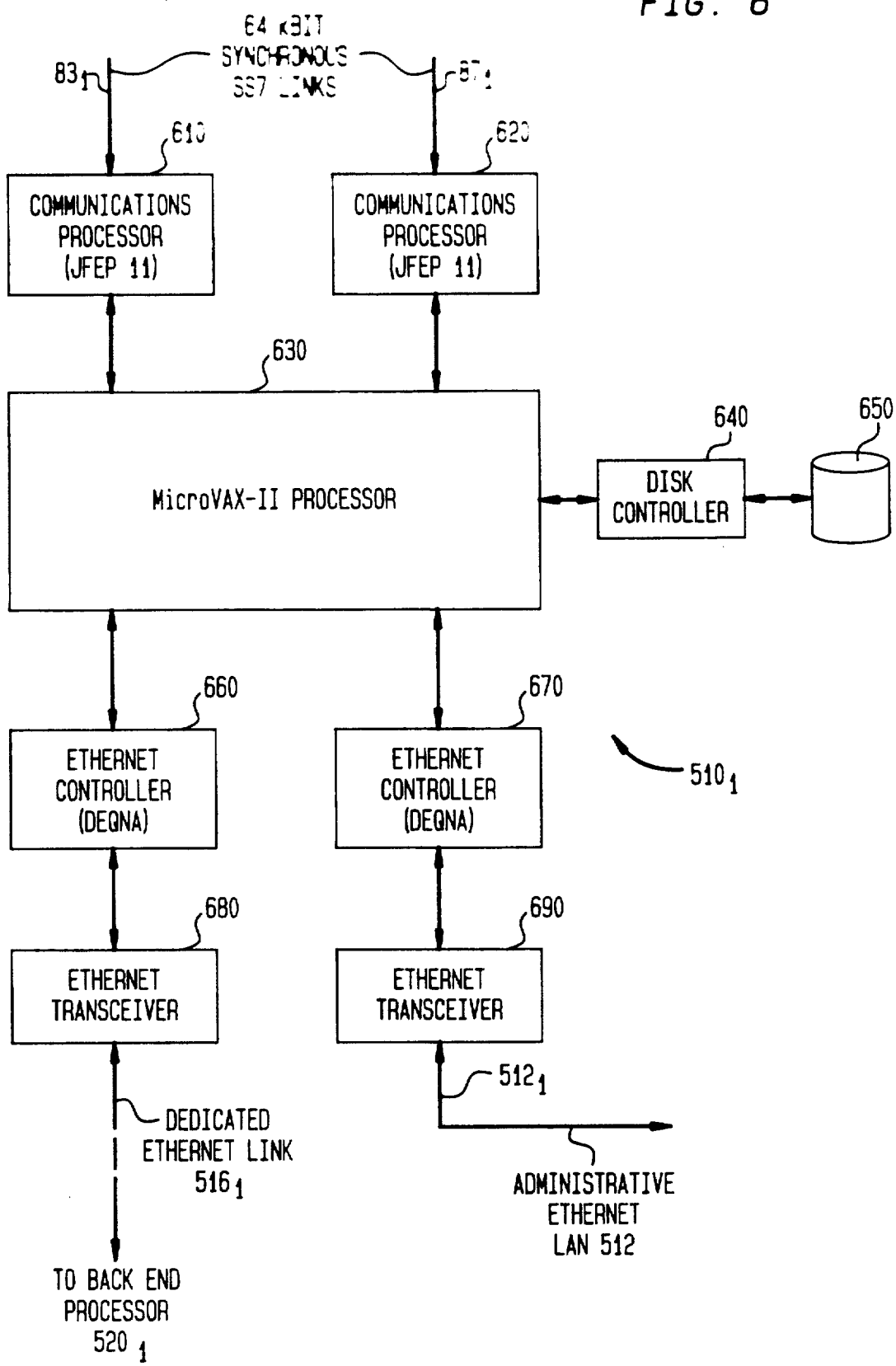
FIG. 6 depicts a block diagram of front end processor $510_1$ situated within SCP 500 shown in FIGS. 5A and 5B.

FIG. 6 depicts a block diagram of any front end processor, such as processor 510$_1$, situated within SCP 500 shown in FIGS. 5A and 5B. As shown in FIG. 6, the front end processor consists of MicroVAX-II processor 630 that is interfaced to each of two 64 kbit synchronous SS7 links 83$_1$ and 87$_1$ through a separate communications processor 610 and 620, respectively. Both communications processors are identical. Specifically, each processor is a model LSI-JFEP II general purpose front end processor currently available from MDB Systems, Inc. of Orange, Calif. The communications processors relieve host MicroVAX-II processor 630 of the task of directly interfacing to the synchronous links by providing on transmission of any message well-known framing functions including, for example: flag generation for frame delineation (message delimiting), zero bit insertion (bit stuffing) for data transparency, and computing the frame check polynomial to generate the check bits for each message and insertion of the check bits into each message. Upon reception of any message, each communications processor searches for and strips message delimiting flags; searches for and deletes stuffed zero bits; and checks for framing errors by locally computing the cyclic redundancy code (check bits) for each received message, then comparing the received check bits against locally computed values therefor and finally generating appropriate error messages should a framing error occur. These processors also provide well-known clocking functions. Each of these processors also detects signal loss (SS7 level 1 errors) on its associated link. Furthermore, these processors generate and transmit FISU (fill-in signal units, as discussed above) messages on each link whenever the link is not being used to carry any other messages, such as LSSUs and MSUs.

Host MicroVAX-II processor 630 is also connected through disk controller 640 to disk drive 650. The disk controller and disk drive are preferably models RDQX2 disk controller and RD52 2 31Mbyte Winchester disk drive, both of which are available from Digital Equipment Corporation. The disk drive is presently used to store diagnostic software. Inasmuch as diagnostic procedures could be downloaded to host processor 630 over administrative ETHERNET network 512 in lieu of being stored locally at each front end processor, this disk drive and its associated controller could be eliminated from the front end processor with attendant cost savings if the diagnostics were to be remotely stored.

To permit front end processor $510_1$ to communicate with its associated back end processor $520_1$ and with the other processors within SCP 500 (see FIGS. 5A and 5B), host MicroVAX processor 630 is connected, as shown in FIG. 6, via ETHERNET controllers 660 and 670 and respective ETHERNET transceivers 680 and 690 to dedicated ETHERNET link $516_1$ and, via lead $512_1$, to administrative ETHERNET local area network 512. Each ETHERNET controller is a model DEQNA controller available from Digital Equipment Corporation. Each of these controllers implements the data link and physical link protocols specified by the ETHERNET standard (standard 803.2 promulgated by the Institute of Electrical and Electronics Engineers). The ETHERNET transceivers are well-known bi-directional hardware receiver/transmitters that provide signal shaping and appropriate amplification.

C. System Software

The software used in the inventive system resides in both the front and back end processors. This software co-ordinates the operation of all processors within the SCP and thereby enables the entire SCP to communicate as one entity, even though multi-processing is occurring therein, to an STP. The STP remains totally ignorant of the replicated processing paths residing within the SCP and is only required to send messages and receive responses (transactions) over physical links connected to an SCP.

Figure 7:
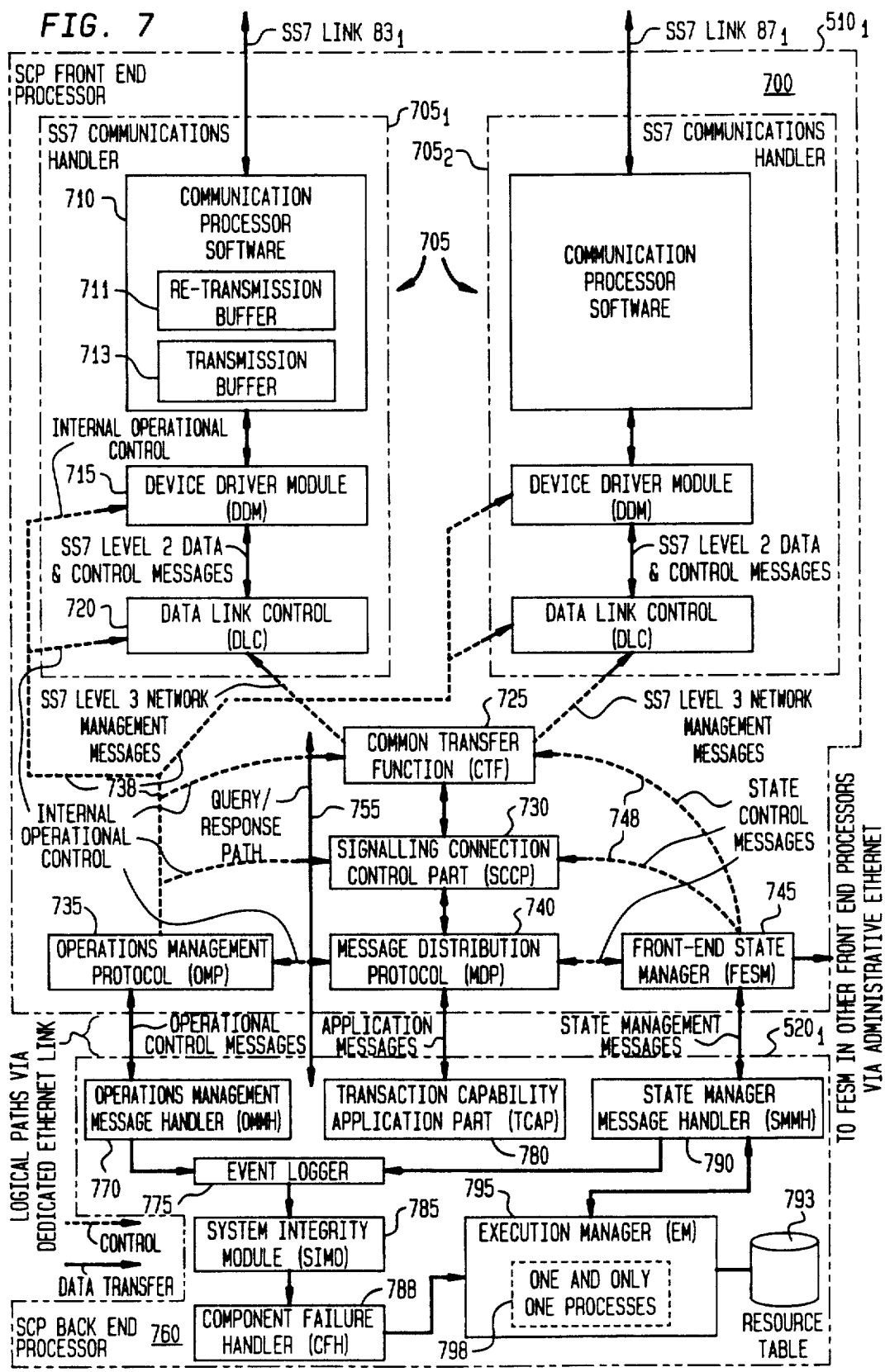
FIG. 7 depicts a high level block diagram of several of the software processes executing within each front end/back end processor pair in SCP 500 shown in FIGS. 4 and 5 and the principal inter-process communication occurring therein.

FIG. 7 depicts a high level block diagram of several of the software processes (modules) executing within each front end/back end processor pair in SCP 500 (see FIGS. 4 and 5) and the principal inter-process communication occurring therein. These processes are event driven. As shown in FIG. 7, processes 700 execute within each front end processor; while processes 760 execute within each back end processor, with the exception of certain processes specifically one-and-only one (O-O-O) processes 798, which as described below execute within execution manager 795 situated within only one of the back end processors. To facilitate understanding, processes 700 and 760 will be described as executing within illustratively a front end/back end processor pair consisting of front end processor $510_1$ and back end processor $520_1$, respectively.

Specifically, as shown in FIG. 7, processes 700 are organized as a hierarchy. As discussed, an incoming SS7 message, such as a packet containing a query, from the CCS network is first processed through one of SS7 communications handlers 705, specifically SS7 communications handler $705_1$ or $705_2$, depending upon which one of two links connected to the front end processor carried the message. Similarly, if a SS7 message, such as a packet containing a query response, is to be transmitted from the front end processor onto the CCS network, then this response will be directed to one of these communications handlers depending upon which one of the two physical SS7 links is to carry this response. Since both communications handlers are identical, then, for the sake of brevity, only communications handler $705_1$ will be discussed. Moreover, operation of communication handler $705_1$ will be discussed in the context of message reception. This handler simply operates in a reverse manner for transmission, with exceptions and additional operations being noted.

SS7 communications handler $705_1$ consists of communication processor software 710, device driver module (DDM) 715 and data link control (DLC) module 720. Communications processor software 710 represents the software executing within a communications processor, such as communications processor 610 (see FIG. 6). As discussed above, this software searches for and strips message delimiting flags from an incoming SS7 message; searches for and deletes stuffed zero bits from this message; and checks for framing errors by locally computing the cyclic redundancy code (check bits) for each received message, then comparing the received check bits against locally computed values therefor and finally generating appropriate error messages should a framing error occur. Also, appropriate transmission and re-transmission software buffers are provided within communications processor software 710. Each SS7 message that is to be transmitted is first loaded into transmission buffer 713. Then, once the communications processor is able to service this message, this message is transmitted onto the associated link. At the same time, the SS7 message is retained in re-transmission buffer 711 for subsequent re-transmission over that link in the event no or a negative acknowledgement message is received, as discussed above.

Furthermore, software 710 also detects signal loss (SS7 level 1 errors) on its associated physical SS7 link. In addition, software 710 instructs its communication processor to generate and transmit FISU (fill-in signal units, as discussed above) messages on the link connected to that processor whenever the link is not being used to carry any other messages, such as LSSUs and MSUs to or from that processor.

The remainder of SS7 communications handler 705₁ executes within a host MicroVAX-II processor, such as processor 630 shown in FIG. 6, situated within a front end processor. DDM module 715 merely provides a well-known software driver allowing the host MicroVAX-II processor to communicate with and control the communications processor in the front end. DLC module 720 provides certain SS7 level 2 functions such as sequencing of SS7 messages for transmission and reception, flow control of messages (in response to congestion, as discussed above) and signalling link recovery.

Once an incoming message has been processed by SS7 communications handler 705, SS7 level 3 front end processing of that message begins. This processing is provided by common transfer function (CTF) module 725, signalling connection control part (SCCP) module 730 and message distribution protocol (MDP) module 740.

CTF module 725 directs incoming messages (queries) to the proper SS7 high level function via message discrimination, as described above in conjunction with signalling message handling task 350 shown in FIG. 3. This module also directs outgoing messages (query responses) to the proper SS7 communications handler, i.e. either 705₁ or 705₂, for transmission over the proper physical SS7 link using message distribution and routing, as described above. In addition, CTF module 725 implements signalling network management task 360 (see FIG. 3). This task, as described above, utilizes pre-defined data and current information regarding the status of the individual physical links and nodes that form the network, to control both current routing of MSUs appearing on the network and also the configuration of the network links and nodes. In the event of changes in status of any physical link or node, this module controls re-configuration of the network (links and nodes) in order to preserve, to the extent possible, or restore normal SS7 message transfer capability on the CCS network.

SCCP module 730, shown in FIG. 7, provides data transport functions between a SS7 communications handler and MDP module 740. Specifically, SSCP module 730 routes incoming messages to the proper application executing at the SCP. The SCCP module maintains a table that provides current status information for each application installed at a corresponding back end processor that executes software 760. Hence, whenever a message is passed to SCCP module 730 by CTF module 725, the SCCP module examines the destination point code stored within a routing label and an accompanying subsystem number (service information octet) both contained within the message to identify the desired application at the current SCP and then, in response, determines whether this message can be processed at this SCP, i.e. SCP 500. If the message can be processed, it is passed onward to MDP module 740 for subsequent transmission to back end processor 520₁. Alternatively, if the message can not be processed due to current unavailability of the desired application, then the message is si discarded. For 800 call applications, SCCP module 730 supports class 0 connectionless service. The SCCP module also provides subsystems status management functions in order to maintain network performance by throttling outgoing traffic in the event of a failure or congestion in the network.

MDP module 740 distributes messages through a DECnet connection between front end processor 510₁ and back processor 520₁. This connection is substantially transparent to the applications executing within back end processor 520₁. Specifically, the MDP module accepts multiple DECnet connections and allocates a different queue for each logical link to be established thereby. The processes provided by MDP 740 and DECnet communications software include establishing a logical link, sending and receiving data over that link, sending interrupt messages, checking status information of a logical link and terminating activity on a link. In addition, to achieve high throughput, MDP module 740 organizes messages into separate groups (blocks) each of which is, in turn, transmitted to the back end processor. In this manner, the back end processor can sequentially process a block of queries and generate a stream of responses without wasting time in processing overhead (framing and the like) associated with a transfer of each individual message. Thus, queries and associated responses follow a path through a SS7 communications handler; then along a path given by arrow 755 through CTF module 725, SCCP module 730 and MDP module 740, and into the transaction capability application part (SS7 application layers) existing in the back end processor.

Two other modules exist within software 700 that executes within the front end processor: operations management protocol (OMP) module 735 and front-end state manager (FESM) module 745. The OMP module performs administration of the front end processor. Specifically, the module maintains various parameter (site specific) values, such as SCP network address, STP address, mate SCP address, link identification numbers, values for each timer, threshold values and the like, in a table for use in properly configuring the SCP front end processor during its initialization. In addition, OMP module 735 allows a system operator (e.g. craftsperson and/or technician) or back end processor 520₁ to modify parameter values in this table as either desires. Also, the front end processor collects various system measurement statistics and provides these measurements to back end processor 520₁ for logging via an appropriate protocol, i.e. a state management protocol. These statistics include the number of messages processed by each layer of SS7, the number of errors detected, processor utilization and the like. Inasmuch as OMP module 735 collects data on all message handling tasks executing within the host MicroVAX-II processor (see FIG. 6) located within front-end processor 510₁, this data collection, as shown in FIG. 7, is symbolized by dashed lines 738 connecting both SS7 communications handlers 705₁ and 705₂, CTF module 725, SCCP module 730 and MDP module 740.

FESM module 745 co-ordinates state changes relevant to physical links or signalling points that affect the entire SCP. This co-ordination is achieved through communications with an execution manager (EM) module executing in back end processor 520₁ and through communications with all the other front end processors located within the SCP. Front end processor co-ordination, as will be discussed below, deals with message routing among peer front ends and is transparent to all the back end processors within the SCP. Inasmuch as FESM module 745 also controls the state of CTF module 725, SCCP module 730 and MDP module 740, this control is represented by dashed lines 748.

Through co-ordination among peer front end processors, the SCP is able to talk with "one voice" to an STP even though transaction processing is separately occurring for each link in any given link set connected to the SCP. Co-ordination between all the front ends in an SCP is achieved through a protocol, illustratively named the front end co-ordination protocol (FCP). This protocol permits FESM module 745 to know the status of all the other front end processors in the SCP. Specifically, whenever a state change occurs in a front end that affects its ability to handle traffic, e.g. new front end arrival, front end processor crash and STP state changes, this state change is communicated through a simple message in the FCP protocol by the FESM module in an affected front end processor, such as FESM module 745, to FESM modules in all other front end processors (e.g. FESM modules in front end processors $510_2$, $510_3$, ..., $510_n$ in FIG. 5) and must be acknowledged by all the other front end processors to the initial FESM module, here FESM module 745. In addition, if back end processor $520_1$ that is executing one-and-only one processes 798, as discussed below, issues an instruction to take a subsystem down on the SCP, a corresponding FCP message, as described below, is communicated by FESM module 745 to FESM modules in all the other front end processors within the SCP in order to cause their corresponding back end processors to bring down the subsystem executing therein. FESM module 745 will provide an appropriate message in order to inform the STP of a state change, as discussed below, only after all suitable FCP acknowledgement messages have been received from the other active front end processors within the SCP.

Front end/back end processor co-ordination occurs through a protocol illustratively named the state manager protocol (SMP). This protocol permits commands affecting subsystem status (such as subsystem in/out of service requests and responses) and other information, such as notifications and acknowledgements, to be communicated: between front end/back end processor pairs, to other back end processors in the SCP, via the FESM module in other front end processors and the administrative ETHERNET local area network, and also between back end processors in primary/mate SCPs, as discussed below.

Front end/back end processor co-ordination occurs whenever back end processor $520_1$ issues a SMP command to gracefully bring a subsystem on an SCP into or out of service. Such commands can only originate from the one back end processor within the SCP that is executing one-and-only one processes 798, as described below. To gracefully bring a subsystem up or down on back-end processor $520_1$, the back end processors issue an SMP subsystem allowed or SMP subsystem out of service request to the front end processor through FESM module 745. FESM module 745 passes the allowed or request message, through adjacent STPs (not shown), to a mate SCP which, in response, gracefully switches traffic to or from SCP 500 from or to a mate SCP. This process is repeated for each different subsystem (application executing at each different back end processor) that is executing on SCP up or 500 in order to gracefully bring the entire SCP down.

The messages passed between front end processor $510_1$ and accompanying back end processor $520_1$ and among all the front end processors within SCP 500 occur through the dedicated ETHERNET link and the administrative ETHERNET local area network, both of which are controlled by appropriate DECnet software executing in both the front and back end processors. In an effort to simplify the figure, this software has been omitted from FIG. 7 but interfaces to OMP module 735, MDP module 740, and FESM module 745 executing in front end processor $510_1$, and operations management message handler 770, transaction capability application part module 780 and state manager message handler 790 executing in back end processor $520_1$ as shown.

Each process that forms front end processes 700 executes as a separate application surrounding a kernel (not shown) consisting of a Portable Communications Executive (CEX) operating system available from Technology Concepts, Inc. This operating system executes within front end processor $510_1$ and provides: well-known mailboxes for inter-process communication; memory management; creation, deletion and scheduling of processes; alarms and timers; buffer management and other well-known software support routines. Additionally, each process that forms processes 760 executes as a separate application surrounding a kernel (also not shown) consisting of a VAX/VMS multi-user, virtual memory operating system, currently available from Digital Equipment Corporation (which also owns the trademark "VMS"), that supports multiple processor operation using shared disk data. The VAX/VMS operating system executes within back end processor $520_1$.

As noted, processes 760, with the exception of only-and-only one processes 798, execute within each back end processor, illustratively back end processor $520_1$. These processes include: operations management message handler (OMMH) module 770, transaction capability applications part (TCAP) module 780, state manager message handler (SMMH) 790, execution manger (EM) 795, event logger module 775, system integrity module 785, and component failure handler 788.

OMMH module 770 communicates with OMP module 735 located within the front end processor via a DECnet logical link. OMMH module 770 is responsible for downloading of front end software. This module also distributes all back end process requests to the front end and distributes front end notification and alarm responses to appropriate back end processes. Furthermore, module 770 logs all front end measurement data provided by OMP module 735 into appropriate disk files for use by administration software (not shown) executing on the back end processor.

TCAP module 780 is the interface (SS7 levels 4 and higher) between the SS7 front end processor and the specific transaction oriented application processes for processing queries, such as destination routing number queries for 800 number calls, executing within the back-end processor. TCAP module 780 accepts blocks of messages, delivered via MDP module 740, from the front end processor, de-blocks these messages, validates the messages, and then delivers each message to the application process. Upon completion of application processing, TCAP accepts response messages from the application, blocks the response messages and delivers them to the front end processor via MDP module 740. A message from an originating SSP that does not conform to the SS7 protocol is discarded by TCAP module 780 which sends an appropriate error message to the front end processor for delivery back to that SSP. Similarly, TCAP module 780 will receive reject messages from an originating SSP in response to invalid messages sent by an application through TCAP. TCAP module 780 will also send an error response message to the SSP that indicates the error condition when an application informs TCAP of an error in the received message.

SMMH module 790 is a message distributor that passes SCP state control information, i.e. when to change the state of a service provided by an SCP, between FESM module 745 executing within a front end processor and EM module 795. This process communicates with FESM module 745 via a DECnet logical link.

Event logger 775 receives changes in status information, e.g. fault conditions, regarding any module in both the front and back end processes from OMMH module 770 and SMMH module 790, logs the faults and maintains a running count of the faults. The event logger module passes fault information to system integrity module (SIMO) 785. This latter module compares a running total of the fault conditions against a numerical threshold to determine whether corrective recovery action should be taken at any given level of detected faults and what specific action is necessary, such as a process re-start or, for severe faults, local SCP node software re-start. Once SIMO determines that corrective action is necessary and the specific action that should be taken, SIMO 785 instructs component failure handler (CFH) module 788 to initiate this action. Once instructed, CFH module 788 will undertake the necessary corrective action. This action is most frequently a process re-start. For example, a process will be re-created by EM 795 if the process abnormally exits, a data area—if it becomes corrupted—can be subsequently reloaded from a disk file, and a SS7 front end processor software can be down-loaded through its corresponding back end, as noted above, after a crash.

EM module 795 is primarily responsible for creating and terminating processes on the back end processor. With respect to processes executing within back end processor $520_1$, the functions of the EM module include: startup/bootstrap, process coordination, process surveillance, graceful shutdown and individual process creation and deletion. In addition, certain processes, so-called one-and-only one (O-O-O) processes 798 execute within the execution manager of only one of the back end processors. The O-O-O processes maintain a disk based table 793 of resources existing within SCP 500 to monitor current call processing capability of the SCP. These resources include the number of active front end processors, the number of active back end processors, the status (e.g. active or failed) of each process associated with each front or back end processor and the status (e.g. active, inactive, out of service) of each specific application assigned to each back end processor. In the event of a process or processor failure within the SCP, and in response to requests to create or delete processes, execution manager 795 (as well as any other EM that creates or deletes a process) instructs O-O-O processes 798 to update resource table 793 so that the table accurately reflects the new status of the SCP. Once this occurs, the O-O-O processes, performs a resource check by comparing entries in the resource table against pre-defined threshold values, which specify minimum acceptable processing configurations, to determine if sufficient processing capacity exists to support each separate subsystem that should be executing within the SCP. If sufficient resources exist for any subsystem (e.g. accompanying SS7 application software is executing on a sufficient number of back end processors and a requisite number of active front and back end processors exist), then the O-O-O process issues a command, as discussed below, through its associated front end processor, e.g. here processor $510_1$, to an adjacent STP connected thereto in order to appropriately re-route traffic to a different link to the SCP and thereby avoid the failed processor or process running thereon. Alternatively, if sufficient resources do not currently exist to support a subsystem, then O-O-O processes 798 issue commands through FESM module 745 and its associated front end processor $510_1$ through an adjacent STP to a mate SCP (SCP 590 in FIG. 4) to institute a changeover procedure. This procedure, if successful and as discussed below, causes the adjacent STP (STP 56 in FIG. 4) to route traffic otherwise destined to SCP 500 for this subsystem, specifically processing of destination routing number queries for 800 number calls, to the mate SCP for processing.

Now, in the event a back end processor fails, then all the other back end processors are informed of this failure, through a well-known VAX/VMS facility (not shown) called "lock manager". Specifically, a lock can only be held by one back end processor at a time. All active back end processors are aware of the location of the locks for all the other back end processors. If a back end processor fails, then the VAX/VMS operating system executing on the back end processor that has the O-O-O processes releases the lock for the failed back end processor thereby allowing that lock to travel to another back end processor. At this point with one less back end processor available, the O-O-O processes commence a resource check as described above and initiate a mate switch procedure, if necessary. If the back end processor executing the O-O-O processes fails, then another back end processor obtains control over these processes.

Upon system power up of SCP 500, each execution manager within each back end processor in the SCP first brings up all processes and SS7 applications executing therein and all processes executing within its corresponding front end processor. Also, an execution manager within a default back end processor, illustratively back end processor $520_1$, is chosen to execute O-O-O processes 798 shown in FIG. 7. This latter execution manager, through the O-O-O processes, then searches the resource table to determine what subsystems should be running within the SCP as a whole and performs a resource check to determine the status of each front end processor and each back end processor and the applications presently executing on each back end processor. If sufficient resources are currently available to support a subsystem within the SCP, then this execution manager, through O-O-O processes 798 executing in back end processor $520_1$, sends an appropriate subsystem allowed message for that subsystem through front end processor $510_1$ to the adjacent STP to obtain traffic for processing on that subsystem. This is repeated for each subsystem executing on the SCP.

The hardware that constitutes each SCP front end processor, e.g. processor $510_1$, (see FIG. 7) and the software executing therein, specifically software 700, have been implemented into fully operational components by Technology Concepts, Inc. of Sudbury, Mass. for use within a CCS network that provides fault tolerant transaction processing of queries for 800 calls and other enhanced calling services. The hardware that constitutes each SCP back end processor and the inter-connected storage and peripheral devices as well as back end software processes 760 have been fully implemented into operational components by Bell Communications Research, Inc., which is the present assignee.

D. Inter-Process and Inter-Processor Co-ordination Involving an SCP

A number of conditions involving an SCP can occur which require various levels of co-ordination between the separate front end processors within the SCP, between the front and back end processors within the SCP and/or between different front end/back end processor pairs within the SCP and its mate SCP and adjacent STPs to properly and gracefully re-route message traffic flowing therebetween. These conditions illustratively include: detection of a failed link in a SS7 link set, bringing a subsystem executing within an SCP into service (i.e. allowing a subsystem) and invoking a mate (SCP) switch operation to take a subsystem out of service. These conditions will now be discussed in conjunction with FIGS. 8-13. To facilitate understanding, circled numbers are used in these figures to easily designate different co-ordination messages occurring between separate network components (SCPs and STPs), (front end alone, and/or front and back end) processors and/or processes executing within these processors. Even though the same circled number is used in two or more of these figures, these circled numbers do not refer to identical elements occurring within FIGS. 8-13.

Figure 8:
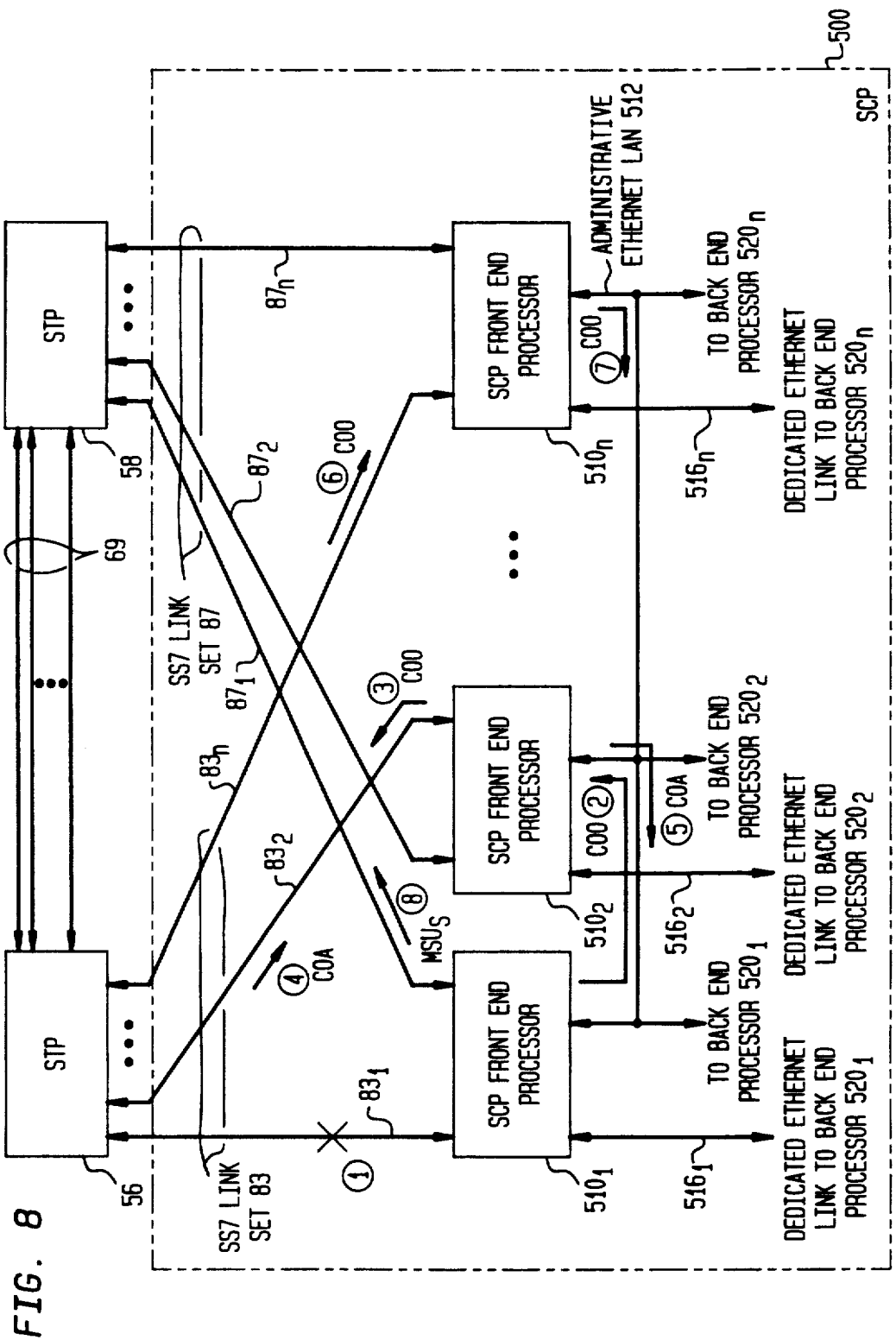
FIG. 8 diagrammatically shows the communication occurring between SCP 500 and STPs 56 and 58 during the handling of a SS7 link failure.

FIG. 8 diagrammatically shows the communication occurring between SCP 500 and STPs 56 and 58 during the handling of a SS7 link failure. Since no back end processors within an SCP take part in handling a link failure, all of the back end processors as well as other non-involved components of an SCP have been omitted from FIG. 8. Also, since link failures are handled in an identical manner for all links, this discussion will concern a failure of illustrative SS7 link $83_1$.

Specifically, assume for the moment that SCP front end processor $510_1$ has detected that physical SS7 link $83_1$ situated within SS7 link set 83 has just failed (circled number one). Also assume that the other link, i.e. link $87_1$ in link set 87, connected to SCP 500 is active. In this case, SCP front end processor $510_1$ sends a changeover (COO) signal, via administrative ETHERNET local area network 512, to the next front end processor, i.e. front end processor $510_2$, in SCP 500 (circled number two). This signal requests that the latter front end processor take over the messages otherwise destined for the failed link. Once front end processor $510_2$ receives the changeover signal, this processor determines whether it is able to handle this traffic. If this processor determines that is has an active link in the same link set as the failed link, then this processor transmits a changeover signal (COO) to STP 56 over link $83_2$ to inform the STP that link $83_1$ has failed (circled number three) and requesting the STP to re-route traffic to link $83_2$ within link set 83. The STP then sends a changeover acknowledgment (COA) signal over link $83_2$ back to front end processor $510_2$ (circled number four). Once front end processor $510_2$ receives the changeover acknowledgement signal, it will place a changeover acknowledgement (COA) signal onto administrative ETHERNET local area network 512 (circled number five). This COA signal will be routed, using token passing, as described above, to SCP front end processor $510_1$. At essentially the same time as items represented by circled numbers 1-5 are sequentially occurring, STP 56 sends a changeover (COO) signal through any active link, e.g. link $83_n$, in link set 83 (circled number six). The purpose of this is to provide a redundant signal to front end processor $510_1$ to instruct this processor to sequentially transmit all messages stored within its re-transmission buffer for the failed link onto the other link, i.e. link $87_1$ in link set 87. Once the changeover signal is received by SCP front end processor $510_n$, this front end processor places the changeover signal onto administrative ETHERNET local area network 512. Now, as soon as front end processor $510_1$ receives either the changeover (COO) or changeover acknowledgement (COA) signal from administrative ETHERNET local area network 512, front end processor $510_1$ sequentially transmits all messages it has retained in its re-transmission buffer associated with failed link $83_1$ by moving these messages to the transmission buffer associated with active link $87_1$ and subsequently transmitting these messages (e.g. MSUs) in sequence over this latter link (circled number eight).

Figure 9B:
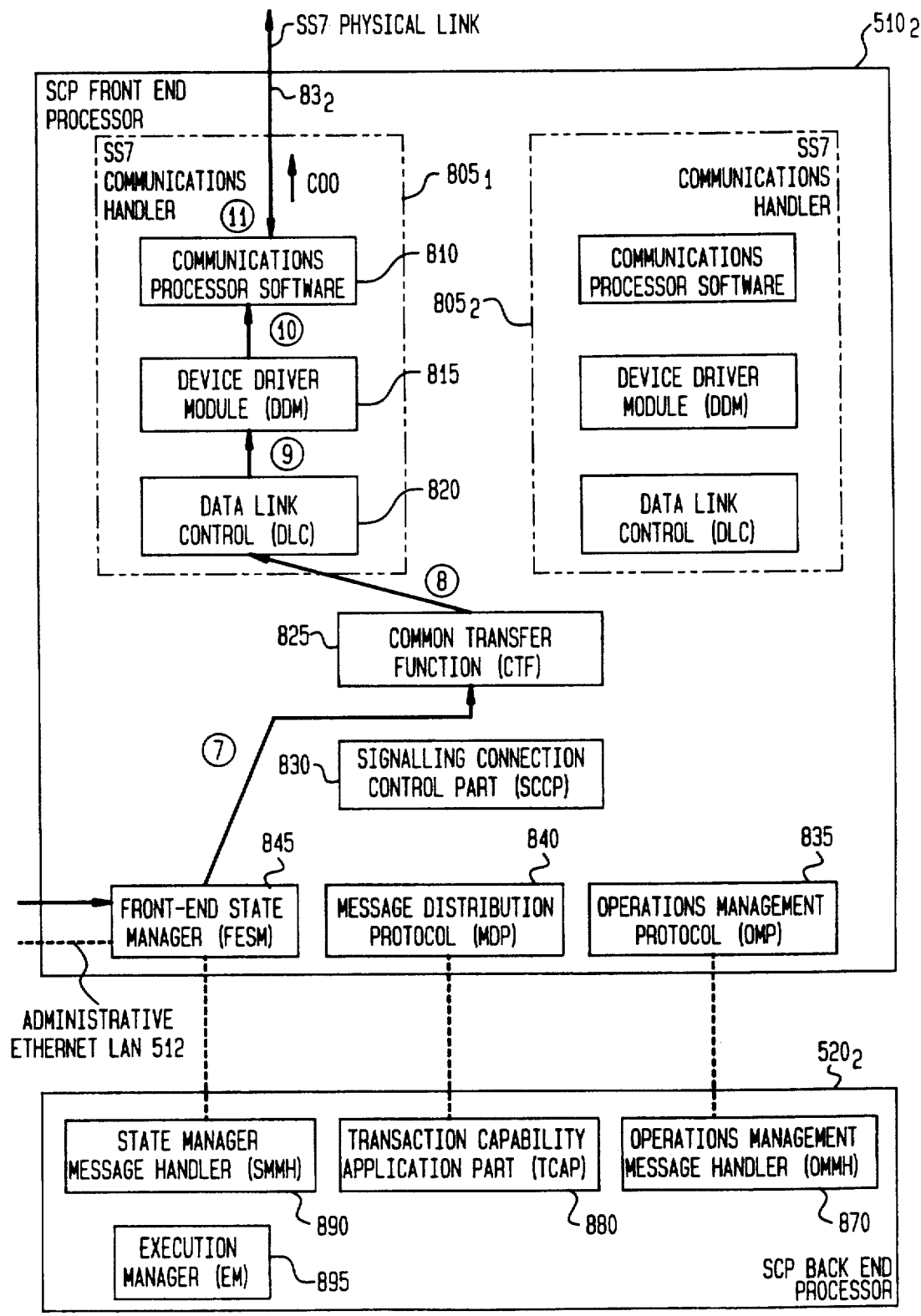

A sequence of inter-process communications, that occurs within SCP front end processors $510_1$ and $510_2$ shown in FIG. 8, during the handling of a link failure is diagrammatically shown in FIGS. 9A and 9B, for which the correct alignment of the drawing sheets for these figures is depicted in FIG. 9. Now, once link $83_1$ fails, this failure (circled number one) is detected by SS7 communications handler $705_1$ which processes SS7 levels 1 and 2 for messages appearing on this link. Within communications handler $705_1$, a communications processor executing communications processor software 710 sends an asynchronous event signal which reports the link failure to DDM module 715 (circled number two). Thereafter, DDM module 715 sends an asynchronous event message to DLC module 720 to report the link failure and failure type (e.g. link power lost, alignment error or the like) (circled number three). Once this has occurred, DLC module 720 sends an asynchronous event message to CTF module 725 to report the link failure and specify the link identification number and the failure type (circled number four). In response to this message, CTF module 725 creates a changeover (COO) message and sends this messages to FESM module 745 (circled number five). Once the FESM module receives this changeover message, it transmits the message, via DECnet communications software and token passing over administrative ETHERNET local area network 512 here represented by a dashed line, to the FESM module in a next SCP front end processor, here front end processor $510_2$. Upon receipt of this message, FESM module 845 in front end processor $510_2$ determines whether this processor has an active link in the same link set as the failed link, i.e. link set 83. In the event, FESM module 845 determines that link $83_2$ in link set 83 is not available, then FESM module 845 instructs the communications software to place the changeover (COO) message back onto administrative ETHERNET network for transmission to the next front end processor. If, however, front end processor $510_2$ has such an active link, such as link $83_2$, then, as shown, FESM module 845 will not re-transmit the changeover message onto network 512 but instead will send this message to CTF module 825 (circled number seven). Upon receipt of this message, CTF module 825 adds routing information to the message and passes the resulting changeover message on to DLC module 820 (circled number eight). DLC module 820 adds framing information to the message and passes the resulting changeover message to DDM module 815 (circled number nine). DDM module 815 then instructs communications processor software 810 to add appropriate message delimiter flags to this changeover (COO) message (circled number 10) to provide a SS7 message, place the SS7 message in a transmission buffer and finally transmit the resulting SS7 message over link $83_2$ to an adjacent STP (circled number 11).

Figure 10:
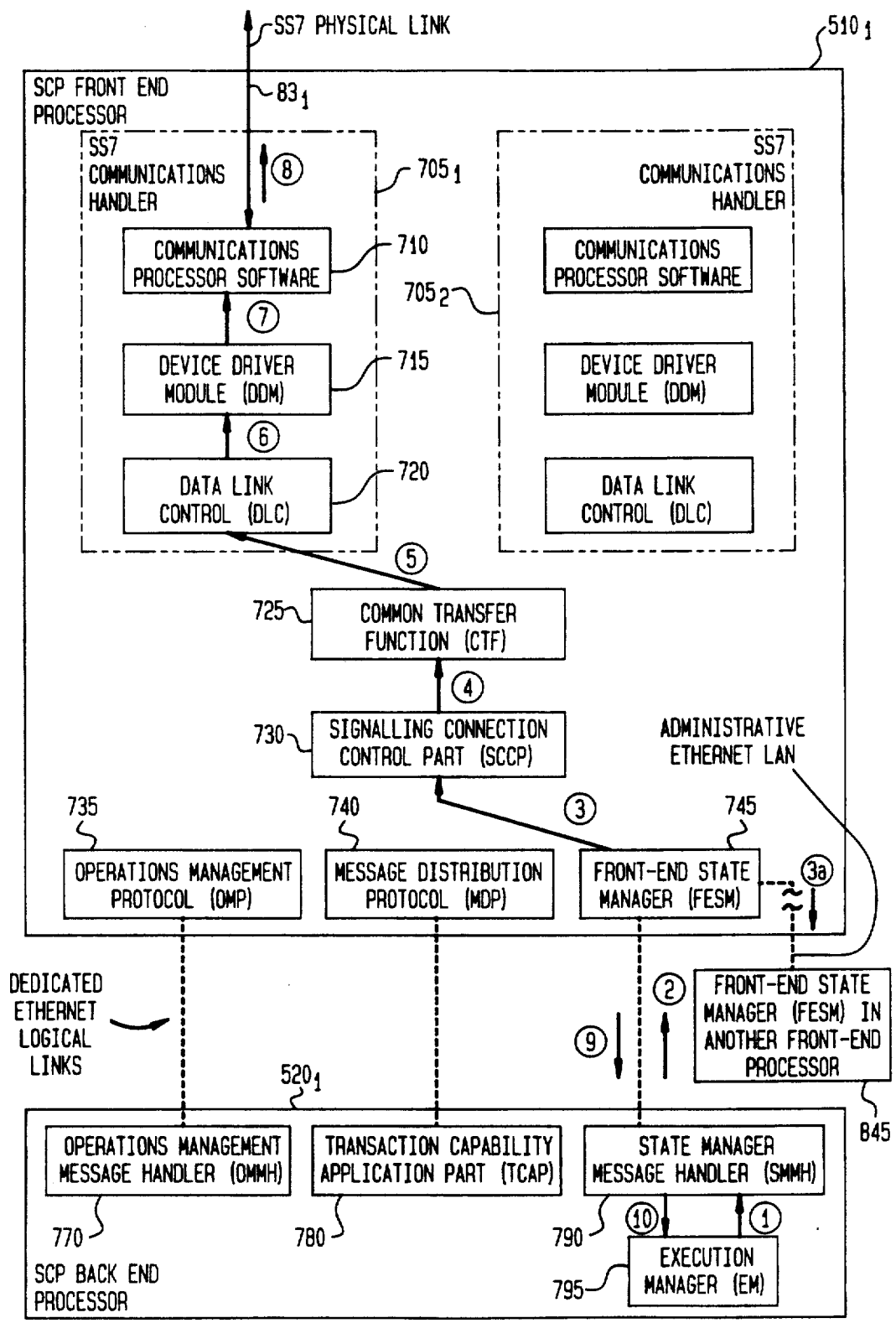
FIG. 10 diagrammatically shows a sequence of inter-process communications that occur within SCP front end processor $510_1$ and back end processor $520_1$ for bringing a subsystem executing on back end processor $520_1$ into service.

FIG. 10 diagrammatically shows a sequence of inter-process communications that occur within SCP front end processor $510_1$ and back end processor $520_1$ for bringing a subsystem into service on back end processor $520_1$. In order for a subsystem to be brought into service on a back end processor, the execution manger (EM) that executes the one-and-only one processes (here EM module 795) must confirm through a resource check that all hardware components, such as disk drives and front end processors) that are to be used by that subsystem within the SCP are up and running. This execution manager must then determine, also through a resource check, whether each individual software process that is to be used by the subsystem within the SCP is also up and running. If all the hardware and software processes are running, then this execution manager can bring up a subsystem. Now, in the event EM module 795 executing in back end processor $520_1$ decides to bring a subsystem into service to support an application executing within SCP 500, the EM module sends an appropriate subsystem allowed message which identifies a particular subsystem to SMMH module 790 (circled number one). Upon receipt of this message, SMMH module 790 passes the message, via a logical ETHERNET link and appropriate DECnet communications software, to FESM module 745 in front end processor $510_1$ (circled number two). The FESM module sends this subsystem allowed message to SCCP module 730 (circled number three) and at essentially the same time places the subsystem allowed message onto the administrative ETHERNET network (circled number 3a) for communication to all other front end processors within SCP 500 to invoke the subsystem in all other active back end processors situated within SCP 500. After SCCP module 730 receives the subsystem allowed message, it updates its local subsystem state tables. Thereafter, the SCCP module sends the subsystem allowed message to CTF module 725 (circled number four). Upon receipt of this message, CTF module 725 adds routing information to the message and passes the resulting message to DLC module 720 (circled number five). This latter module adds message sequencing information to the subsystem allowed message and passes the resulting message to DDM module 715 (circled number six). Thereafter, DDM module 715 passes the resulting subsystem allowed message to communications processor software 710 which adds appropriate check bits and message delimiter flags to the message to form a SS7 message (circled number seven) and then transmits this message over physical link $83_1$ to an adjacent STP (circled number eight). Once these operations have been completed, FESM module issues an acknowledgement message to SMMH module 790 within back end processor $520_1$ (circled number nine). In response to this acknowledgement message, SMMH module 790 passes the acknowledgement message to EM module 795 which invokes the subsystem within back end processor $520_1$ (circled number ten).

Figure 11:
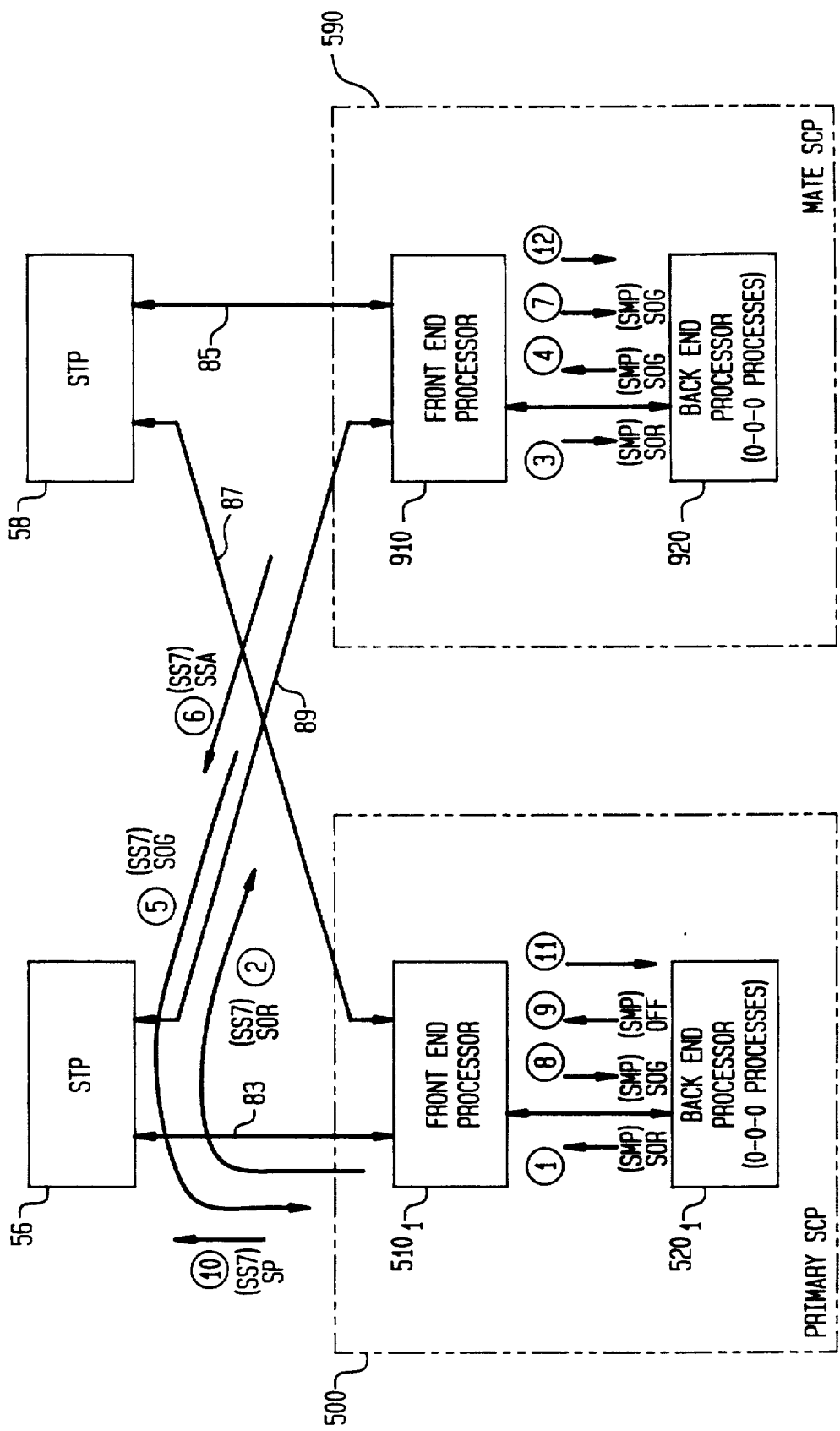
FIG. 11 diagrammatically shows a sequence of communications that occur between primary and mate SCPs and an adjacent STP to effectuate a mate switch operation.

FIG. 11 diagrammatically shows a sequence of communications that occur between primary and mate SCPs and adjacent STPs to effectuate a mate switch operation. A mate switch, when successfully completed, transfers message traffic and accompanying processing of a subsystem (an entire application, such as 800 call processing) from an SCP, referred to as a primary SCP, to another SCP, referred to as a mate SCP. A subsystem executing on an SCP can be brought down in one of two ways: through manual intervention, by e.g. a craftsperson and/or technician, using maintenance and operations subsystem 570 (see FIGS. 5A and 5B), or automatically by the SCP itself in the event of a failure occurring therein. Specifically, as discussed above, if a process or processor fails and a subsequent resource check, conducted by the one-and-only one processes executing within an execution manager in a back end processor within the SCP, reveals that insufficient resources are currently available to support a subsystem in the SCP, then that execution manager, through the one-and-only one processes, invokes a mate switch operation for that subsystem. As will be seen below, a mate switch operation can not occur unilaterally at the request of a primary SCP but rather is the result of negotiations conducted between primary SCP 500 and mate SCP 590.

Figure 12:
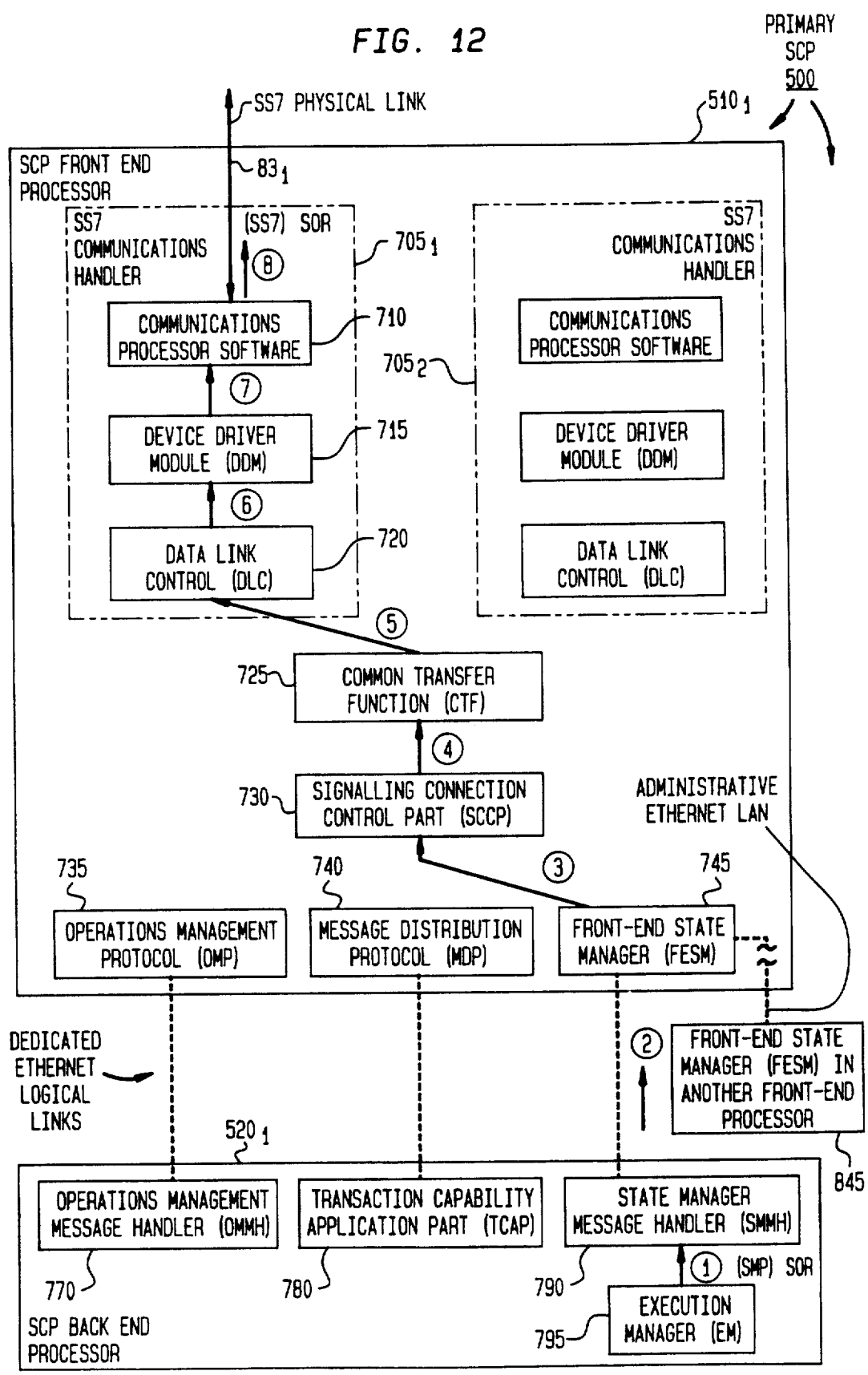
FIG. 12 diagrammatically shows a sequence of inter-process communications that occur within SCP front end processor $510_1$ and back end processor $520_1$ situated within SCP 500 for generating a SS7 subsystem out of service request (SOR) message in order to invoke a mate switch operation.
Figure 13:
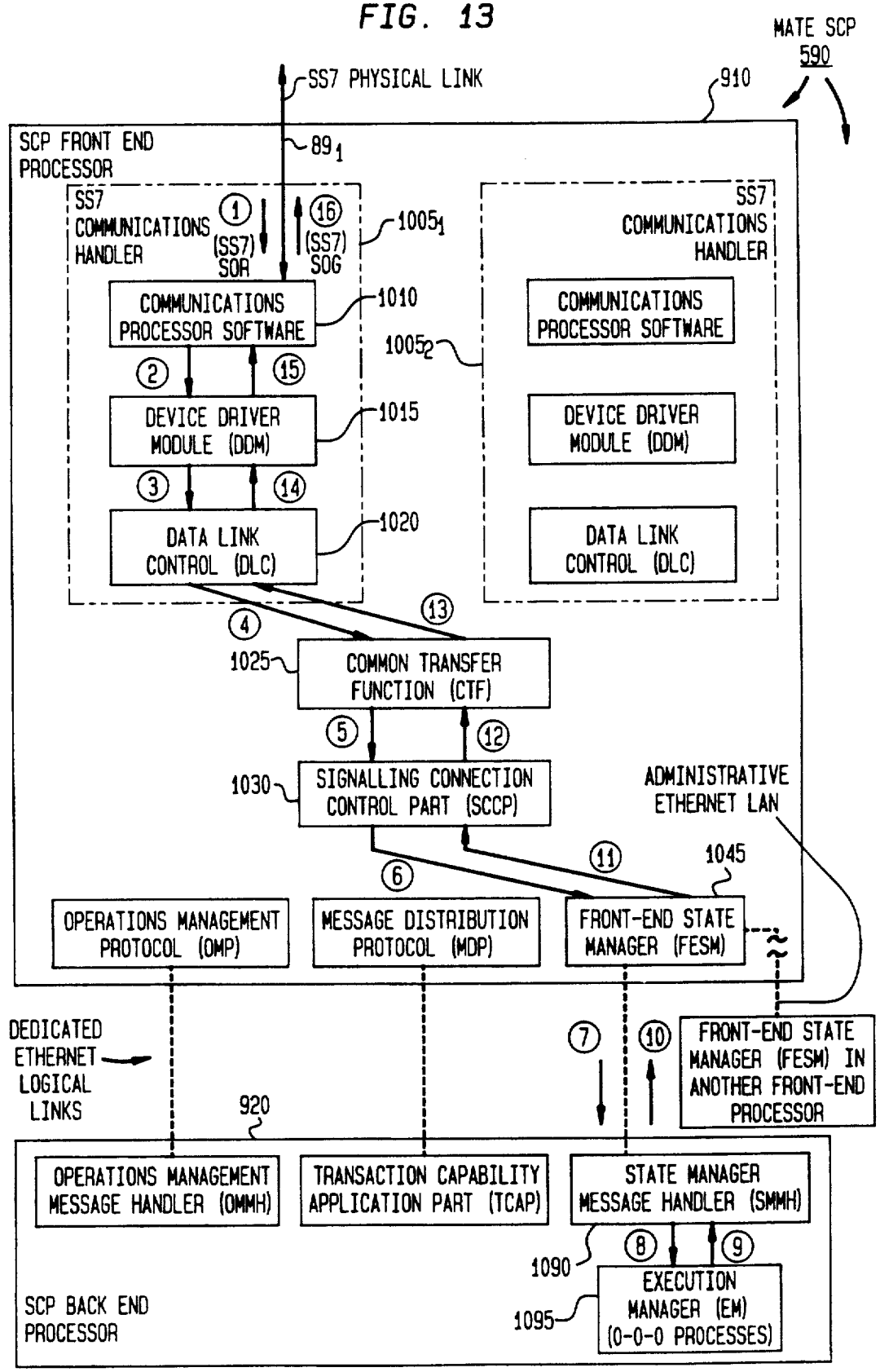
FIG. 13 diagrammatically shows a sequence of inter-process communications that occur within SCP front end processor 910 and back end processor 920 situated within mate SCP 590 in response to an incoming SS7 SOR message initially issued by SCP 500 as part of a mate switch operation.

Since the only back end processor in the primary SCP that communicates with a mate SCP is the back end processor executing the one-and-only one processes, all other back end processors and their associated front end processors in both the primary and mate SCPs have been omitted from FIGS. 11-13 to simplify these figures.

Specifically, as shown in FIG. 11, if the one-and-only processes executing within an execution manager in back end processor $520_1$ in primary SCP 500 determine that a subsystem executing within the primary SCP is to be brought down, then back end processor $520_1$ first issues a subsystem out of service request (SOR) message to its associated front end processor $510_1$. This message is passed through front end processor $510_1$ because back end processor $520_1$ is unable to create SS7 messages (circled number one). This operation is explained in detail below in conjunction with FIG. 12. Communication between front and back end processors is through the state management protocol (SMP). In response to the reception of a SMP SOR message at front end processor $510_1$, this processor converts the message into a level four SS7 message with a routing code specifying mate SCP 590. Each SCP maintains the address of its mate SCP. Once this SOR message is generated in SS7 format, front end processor $510_1$ transmits this message over an available link in link set 83 and through STP 56 to mate SCP 590 (circled number two). Upon receipt of this message, mate SCP front end processor 910 converts the SS7 SOR message into an SOR message in the state management protocol and transmits a resulting (SMP) SOR message to mate back end processor 920 (circled number three).

In response to an SMP SOR message, back end processor 920 undertakes a resource check to determine if mate SCP 590 can provide the necessary subsystem (application) processing requested by primary SCP 500. The mate SCP will grant a service request from the primary SCP only if all the front and back end processors are active in the mate. If insufficient resources exist, then back end processor 920 in mate SCP 590 will simply ignore the received SMP SOR message. If this request is ignored, then after a short finite time has elapsed without a response, back end processor $520_1$ in primary SCP 500 will issue another SOR message to the mate. If this request is ignored again, then back end processor 520₁ in primary SCP maintains the application in an active state provided at least one front and back end processor pair remains active. As long as one front end/back end processor pair is active, then primary SCP 500 continues to process messages though at a degraded rate.

Alternatively, if the resource check performed in the mate SCP discloses that all processors are active, then back end processor 920 issues a SMP subsystem out of service grant (SOG) message to mate front end processor 910 (circled number four). Upon receipt of this message, the mate front end processor converts the SMP SOG message into a SS7 subsystem out of service grant message and then transmits that SS7 SOG message through an available link in link set 89 through STP 56 to primary SCP 500 (circled number five). Also, the mate front end processor issues a SS7 subsystem allowed (SSA) message to adjacent STP 56 over an available link within link set 83 to instruct this STP to route message traffic otherwise destined for the subsystem being terminated on the primary SCP to the same subsystem running on mate SCP 590 (circled number six). After this has occurred, the mate front end processor furnishes an SMP SOG message to mate back end processor 920 to confirm that a SOG message has been sent to the primary SCP (circled number seven). The SS7 SOG grant message received at the primary SCP is used to terminate the subsystem running at this SCP. In particular, whenever primary front end processor 510₁ receives a SS7 SOG message from STP 56, it converts this message into an SMP SOG message and passes the resulting message to primary back end processor 520₁ (circled number eight). In response to this SMP SOG message, back end processor 520₁ takes the subsystem out of service. Once this occurs, primary back end processor 520₁ provides an SMP off message to front end processor 510₁. The front end processor distributes this off message to all the other front end processors within primary SCP 500 to cause all the front end processors to refuse traffic for this subsystem and cause all the corresponding back end processors to bring the subsystem down on those latter processors (circled number nine). In response to the off message, front end processor 510₁ issues a SS7 subsystem prohibited (SP) message to adjacent STP 56 to instruct this STP not to send any message traffic for the terminated subsystem to primary STP 500 (circled number ten). After this SS7 SP message has been transmitted to STP 56, primary front end processor 510₁ issues an appropriate message to primary back end processor 520₁ (circled number eleven) to notify it that all front end processors in primary SCP 500 are prohibited from accepting traffic for this subsystem from any corresponding back end processor in the primary SCP. Also, in response to receiving a subsystem prohibit message, STP 56 issues an SS7 message to mate front end processor 910 which, in turn, causes the mate front end processor to send a notification (circled number twelve) to mate back end processor 920 that the subsystem is now off in the primary SCP. After these operations have been concluded, STP 56 sends all traffic for the subsystem now terminated on primary SCP 500 over link set 89 to the same subsystem that is now running on mate SCP 590.

FIG. 12 diagrammatically shows a sequence of interprocess communications that occurs within SCP front end processor 510₁ and back end processor 520₁ situated within primary SCP 500 for generating the SS7 subsystem out of service request (SOR) message in order to invoke a mate switch operation. As noted above, only the one-and-only one processes executing within the execution manager in the primary SCP are able to bring a subsystem down. Therefore, if these processes determine after a resource check that a subsystem executing in primary SCP 500 is to be taken down, then these processes instruct execution manager 795 in back end processor 520₁ to issue a SMP subsystem out of service request (SOR) message for subsequent communication to mate back end processor 920 (see FIG. 11). Once this SMP SOR message is generated, execution manager 795 routes this message to SMMH module 790 (circled number one). Upon receipt of this message, SMMH module 790 sends this message, via a logical dedicated ETHERNET link to FESM module 745 within primary front end processor 510₁ (circled number two). Upon receipt of this SOR message, front end state manager module 745 routes this message to SCCP module 730 (circled number three). This latter module begins the creation of a SS7 SOR message from the SMP SOR message received from the back end processor. In particular, SCCP module 730 accesses the network address of the mate SCP. The SCCP module sends this address embedded within a basic SS7 out of service request message to CTF module 725 (circled number four). This latter module adds an appropriate SS7 routing label into the SS7 message and then sends the resulting message to DLC module 720 (circled number five). This latter module adds SS7 message sequencing information to the message it receives and sends the resulting message to DDM module 715 (circled number six). DDM module 715 adds check bits and delimiter flags to the message and passes the now completed SS7 message to communications processor software (circled number seven) which instructs its associated communications processor to transmit the SS7 SOR message onto illustratively onto link 83₁ within link set 83 for transport through an adjacent STP to mate SCP 590 (see FIG. 11).

FIG. 13 diagrammatically shows a sequence of interprocess communications that occurs within SCP front end processor 910 and back end processor 920 situated within mate SCP 590 in response to an incoming SS7 SOR message initially issued by SCP 500 and subsequently routed by STP 56 to mate SCP 590 as part of a mate switch operation. In particular, whenever a SS7 SOR message (circled number one) appears on a link, illustratively link 89₁, situated within link set 89, connected to mate SCP, this message is first processed by SS7 communications handler 1005₁ existing within mate SCP 590. Specifically, communications processor software 1010 passes the received SS7 message to DDM module 1015 (circled number two). This module strips the delimiter flags and check bits from the SS7 message and passes the resulting message to DLC module 1020 (circled number three). This module extracts and checks the message sequencing information contained within the incoming message and passes the resulting message to CTF module 1025 (circled number four). Once this occurs, CTF module 1025 removes the routing label contained within the message it receives and, if the routing label points to the mate SCP, then the CTF module passes the message onward to SCCP module 1030 (circled number five). If this message is destined for another SCP, CTF module discards this message. Once SCCP module 1030 receives the message, it determines based upon the routing label whether this SOR message is for a subsystem resident within mate SCP 590. If it is not for such a subsystem, then the message is discarded by SCCP module 1030. Alternatively, if the SOR message is for a subsystem resident on the mate SCP, then SCCP module 1030 passes the SOR message to FESM 1045 (circled number six). FESM module 1045 creates an SMP SOR message and passes the SMP message, via a logical ETHERNET link, to SMMH 1090 in mate back end processor 920 (circled number seven). In response to the arrival of this message, SMMH 1090 passes the message to execution manager 1095 for processing by the one-and-only one processes executing therein (circled number eight).

As described above, execution manager 1090 upon receipt of a SOR message undertakes a resource check using the one-and-only one processes executing therein to determine if sufficient processing resources are available within the mate SCP to provide the necessary subsystem processing requested by the primary SCP. In the event insufficient resources (i.e. less than all front and corresponding back end processes are active within the mate SCP) exist within mate SCP 590, then execution manager 1095 simply ignores this SOR message. Alternatively, if all the front and corresponding back end processors are active in the mate SCP, then the one-and-only one processes instruct execution manager 1095 to issue an SMP SOG message to SMMH module 1090 (circled number nine). The SMMH module forwards this SMP SOG message over a logical dedicated ETHERNET link to FESM module 1045 within mate front end processor 910 (circled number ten). FESM module 1045, upon receipt of the grant message, passes the message to SCCP module 1030 which begins the creation of a SS7 SOG message from the SMP SOG message received from the back end processor. In particular, SCCP module 1030 accesses the network address of the primary SCP (which is the mate SCP to SCP 590). The SCCP module sends this address embedded within a basic SS7 subsystem out of service grant message to CTF module 1025 (circled number twelve). This latter module adds an appropriate SS7 routing label into the SS7 message and then sends the resulting message to DLC module 1020 located within SS7 communications handler 1005₁ (circled number thirteen). This latter module adds SS7 message sequencing information to the message it receives and sends the resulting message to DDM module 1015 (circled number fourteen). DDM module 1015 adds check bits and delimiter flags to the message and passes the now completed SS7 message to communications processor software 1010 (circled number fifteen) which instructs its associated communications processor to transmit the SS7 SOG message onto link 89₁ within link set 89 for transport through an STP 56 to primary SCP 500 (see FIG. 11). Once this has occurred, primary SCP 500 can terminate the subsystem on its back end processors, as described above.

The inventive system is not limited to being employed in networks using the SS7 communication protocol. In fact, any communication protocol which utilizes multiple individual links within a link set to carry communication between two points in a network and in event of a node or link failure, adaptively re-distributes traffic among the remaining individual links in the set can be used instead of SS7. For example, X.25 is one such protocol that can be configured to support multiple links in a link set. To use another communication protocol, such as X.25, the software described above, would need to be modified in a relatively inexpensive manner readily apparent to those skilled in the art to provide appropriate interfaces and control procedures for each level residing in the desired protocol. Therefore, by connecting a non-fault tolerant front end processor and a non-fault tolerant back end processor to each link appearing in a link set at a processing node, such as an SCP, within a network executing such a protocol and loosely coupling the processors in the manner set forth above, a relatively inexpensive realtime fault tolerant transaction processing system for use on this network can be easily fabricated.

Furthermore, although the inventive system is shown and described as having one back end processor connected to each front end processor, more than one back end processor could be used with each front end processor. The specific number of back end processors that can be connected to any front end processor is determined by the processing capacity of that front end processor. In essence, the front end processor, which is connected to several back end processors, must be able to receive incoming messages from the network, process each incoming message to obtain the query contained therein and pass these queries to each of these back end processors, and also accept resulting responses from each of these back end processors, generate outgoing network messages containing these responses, and finally transmit these outgoing messages onto the network all at a rate that insures a sufficiently rapid response time for every incoming message. The additional processing load placed on the front end processor significantly increases with each additional inter-connected back end processor. Therefore, to provide a cost effective design using currently available technology, only one back end processor is preferably connected to each front end processor.

Although a single embodiment which incorporates the teachings of the present invention has been shown and described herein, those skilled in the art can readily devise many other varied embodiments that incorporate these teachings.

We claim:

1. A fault tolerant transaction processing system comprising:
   first and second nodes for communicating pluralities of first and second messages therebetween having pluralities of first and second application portions, each of said first and second messages respectively having either a first or second application portion, wherein said first node provides one of said first messages and in response thereto said second node provides a corresponding one of said second messages,
   a link set having a plurality of individual links interconnecting said first and second nodes;
   means, operative in said first node for distributing individual ones of said first messages on an approximately equal basis among available links within said link set for carriage thereover to said second node; and
   a processing system contained within said second node having:
   a plurality of first processors and a plurality of second processors, each of said first processors being connected to a different corresponding one of said links, wherein each one of said first processors receives over the link connected thereto ones of said first messages appearing thereon to yield received first messages, extracts ones of said first application portions from said received first messages to provide extracted first application portions and provides said extracted first application portions to a corresponding one of said second processors, wherein said one first processor receives ones of said second application portions from said one second processor and associated with said extracted first application portions, forms one of said second messages containing said ones of the second application portions and applies said ones of the second messages to the link connected thereto for carriage thereover to said first node, and wherein each one of said second processors is connected to a corresponding one of said first processors for processing ones of the extracted first application portions provided thereby to yield associated ones of said second application portions and for providing said associated ones of said second application portions to said corresponding one of said first processors; and inter-processors coordination means, collectively situated within all the first and second processors and operative in response to an abnormal condition of any one of said links, the first processor connected thereto or the second processor associated therewith, for generating a third message and transmitting the third message over an available one of the links to said distributing means in order to declare that said any one link is unavailable; whereby while the abnormal condition exists the distributing means applies substantially no subsequently occurring ones of the first messages to the unavailable link and distributes substantially all the subsequently occurring ones of the first messages among remaining available ones of said links for processing by the first processors connected thereto and the second processors associated therewith so as achieve fault tolerant transaction processing.

2. The processing system in claim 1 further comprising an inter-processor communication path interconnecting all of said first and second processors; and wherein said inter-processor coordination means further comprises means, situated in each of said first and second processors and operative in conjunction with said inter-processor communication path, for controllably co-ordinating the operation of said first and second processors in a pre-defined manner and in response to the abnormal condition in order to transfer processing of said first messages and formation of said second messages between different ones of said first processors or to transfer processing of said first application portions and providing of corresponding ones of said second application portions between different ones of said second processors.

3. The system in claim 2 wherein said distributing means comprises means operative in response to a command received over a link and originating from one of said second processors for re-distributing subsequent ones of said first messages among functioning non-congested links situated within said link set in the event of a failure of or congestion in a link, failure of an associated one of said first processors connected thereto or failure of one of second processors associated therewith or failure of a processes executing within said first or second processor.

4. The system in claim 3 wherein said distributing means further comprises means for allocating individual ones of said first messages among individual available links within a link set such that all such available links within the link set carry a substantially equal number of messages.

5. The system in claim 4 wherein said allocating means comprises:

means for choosing a link set emanating from said first node based upon a value of a bit located within a pre-determined selection field located within said first message;

means for choosing a link within the link set to carry said first message based upon the value of a pre-determined number of remaining bits located within the selection field; and means for rotating the bits comprising the selection field at least one place and storing resultant rotated bits within the selection field prior to transmitting the resulting selection field as part of said first message from said first node to another node.

6. The system in claim 2 further comprising a network having said first node and a corresponding pair of second nodes, wherein said first node is connected by a respective link set to each of said second nodes such that said first node is capable of routing individual ones of said first messages to any one of said second nodes.

7. The system in claim 6 wherein one of said pair of second nodes is a mate second node to the other one of said second nodes and wherein said inter-processor coordination means in said one second node and in said mate second mode further comprises means, operative in conjunction with first and second selected ones of said second processors in said one second node and said mate second node, respectively, and corresponding ones of the first processors associated therewith, for transferring in a controlled pre-defined manner processing of the first application portions that would otherwise occur within said one second node to the mate second node in the even of a failure occurring within said one second node.

8. The system in claim 7 wherein said transferring means operative in conjunction with said first selected one of said second processors in said one second node further comprises means for determining whether sufficient operating resources exist within said processing system therein for supporting an application process and, in response thereto, invoking said application process therein in order to process subsequent incoming ones of the first application portions, or, if insufficient resources exist within said one second node, transferring in a controlled pre-defined manner and in conjunction with said transferring means operative in conjunction with said second selected one of said second processors in said mate second node processing of said subsequent incoming ones of the first application portions to said mate second node for processing therein.

9. The system in claim 8 wherein said transferring means further comprises means for maintaining status information regarding each of said first and second processors contained within the processing system in said one second node and processes executing therein.

10. The system in claim 9 wherein said inter-processor coordination means in said one node further comprises means collectively operative in conjunction with all of said second processors in said one node for detecting a failure condition occurring within any one of said first and second processors therein or any process executing therein and means for signalling, over said interprocessor communication path, said transferring means to initiate a determination, based upon said status information, of whether sufficient operating resources exist within said processing system in said one node.

11. The system in claim 10 wherein said failure condition detecting means comprises means situated in each separate one of said second processors comprising:

means for maintaining information regarding status of said separate second processor, the associated one of said first processors connected thereto and the processes executing on both said separate second processor and the associated one of the first processors;

means responsive to said information maintaining means for logging a number of times a pre-defined fault condition occurs in said separate second processor, said associated one of the first processors or any of said processes executing therein;

means responsive to said logging means for comparing said number against a pre-determined threshold value; and means responsive to said comparing means for instituting based upon a difference between said threshold value and said number appropriate corrective action within said separate second processor or the associated first processor to remedy the fault condition.

12. The system in claim 11 wherein said inter-processor coordination means further comprises:

means operative in conjunction with each of said first processors for maintaining information regarding status of everyone of said first processors located within said one second node and for communicating pre-defined commands over said inter-processor communication path among said first processors connected thereto and situated within said one second node; and means operative in conjunction with said first selected one of said second processors and responsive to said transferring means for issuing appropriate ones of said commands to said maintaining and communicating means in said each first processor in said one second node through said inter-processor communication path to each remaining one of the first processors in said second node to order to either allow a particular application process to execute within said second processors in said one second node or prohibit the execution of said application process therein.

13. The system of claim 10 wherein said processing system further comprises means connected to said interprocessor communication path for obtaining status information from any of the first and second processors situated therein and for providing suitable commands thereto.

14. The system in claim 10 wherein the number of links in any one of said link sets includes at least one additional link in excess of a number minimally necessary to carry an expected number of messages between two nodes inter-connected by the one link set.

15. The system in claim 10 wherein each link contained within a link set connected to any one of said second nodes is connected within said any one second noes to a single one of said first processors located therein and said single first processor is connected to only a single one of said second processors also located therein.

16. The processing system in claim 10 further comprising means operative within each of the first processors in each of said second nodes for maintaining network status information regarding the nodes that collectively form said network and for updating said network status information in the even of an associated failure condition effecting any such node.

17. The system in claim 10 wherein said network further comprises at least one third node which generates said first application message and is connected to said first node.

18. The system in claim 17 wherein said network further comprises a pair of said first nodes and a corresponding pair of second nodes, wherein each node within said pair of said first nodes is connected by a respective link set to each of said second nodes such that said first nodes are capable of routing individual ones of said first messages through links comprising two different link sets to any one of said second nodes.

19. The system in claim 18 wherein each of said first nodes is a signal transfer point and each of said second nodes is a service control point and wherein each of said first nodes is inter-connected through a separate link set to two other ones of said first nodes.

20. The system in claim 19 wherein said network comprises a multi-level hierarchy of signal transfer points wherein each of said signal transfer points situated in one level is inter-connected by a different link set to each of two signal transfer points situated in a next successive level.

21. The system in claim 10 wherein said first application portion is a query and said second application portion is an appropriate response to a corresponding query.

22. The system in claim 10 wherein said processing system further comprises a memory device capable of being accessed by each of said second processors, wherein said memory device stores databases that provide the appropriate response for each query.

23. The system in claim 22 wherein said memory device is dual ported and wherein said processing system further comprises a coupling device that provides a path between each of said second processors and either port of said memory device.

* * * * *